(12) United States Patent
Angle et al.

(10) Patent No.: US 8,875,662 B2
(45) Date of Patent: Nov. 4, 2014

(54) BREATHABLE RETRIEVING DEVICE

(75) Inventors: Thomas C. Angle, Auburn, AL (US); Royall M. Broughton, Jr., Opelika, AL (US)

(73) Assignee: Auburn University, Auburn, AL (US)

( * ) Notice: Subject to any disclaimer, the term of this patent is extended or adjusted under 35 U.S.C. 154(b) by 69 days.

(21) Appl. No.: 13/442,582

(22) Filed: Apr. 9, 2012

(65) Prior Publication Data

US 2012/0279459 A1    Nov. 8, 2012

Related U.S. Application Data

(60) Provisional application No. 61/473,304, filed on Apr. 8, 2011, provisional application No. 61/608,689, filed on Mar. 9, 2012.

(51) Int. Cl.
*A01K 29/00* (2006.01)
*A01K 15/02* (2006.01)

(52) U.S. Cl.
USPC .......................................... 119/707; 119/709

(58) Field of Classification Search
USPC .......... 119/707, 702, 709, 710, 711; D30/160
See application file for complete search history.

(56) References Cited

U.S. PATENT DOCUMENTS

| | | | | |
|---|---|---|---|---|
| 1,022,112 A | * | 4/1912 | Smith | 119/711 |
| 1,483,165 A | * | 2/1924 | Eaton | 473/281 |
| 1,534,964 A | * | 4/1925 | Kahnweiler | 119/711 |
| 4,154,013 A | | 5/1979 | Stilwell | |
| 4,160,428 A | | 7/1979 | Wilkinson | |
| 4,557,219 A | | 12/1985 | Edwards | |
| 4,802,444 A | | 2/1989 | Markham et al. | |
| 5,111,771 A | | 5/1992 | Mathews | |
| 5,191,856 A | * | 3/1993 | Gordon | 119/711 |
| 5,265,559 A | | 11/1993 | Borell | |
| 5,390,629 A | * | 2/1995 | Simone | 119/711 |
| 5,592,770 A | | 1/1997 | Gudgel | |
| 5,647,302 A | * | 7/1997 | Shipp | 119/709 |
| 5,673,653 A | | 10/1997 | Sherrill | |
| 5,706,762 A | * | 1/1998 | Dokken | 119/712 |
| 5,711,254 A | | 1/1998 | O'Rourke | |
| 5,865,147 A | * | 2/1999 | Rubin | 119/711 |

(Continued)

OTHER PUBLICATIONS

International Search Report and Written Opinion of PCT/US2012/032771; Jun. 27, 2012; 11 pgs.

(Continued)

*Primary Examiner* — Yvonne Abbott
(74) *Attorney, Agent, or Firm* — Gardner Groff Greenwald & Villanueva, PC

(57) ABSTRACT

A retrieving device includes a body with at least one respiratory passageway formed in it through which a dog can breathe when holding the device in its mouth during retrieval. In some embodiments, the body is hollow and in the form of a shell defining an internal cavity that functions as a lateral respiratory passageway, with communicating respiratory passageways formed through the shell. In other embodiments, the body is solid with internal respiratory passageways formed through it. And in still other embodiments, the body has surface features (e.g., grooves or other thinned portions) that function as external respiratory passageways. In use, the respiratory passageways decrease obstructions to enable the dog to breathe more freely to avoid overheating and associated problems. In addition, one or more flotation elements can be provided in the body so provide buoyancy for the retrieving device in the event it's launched into water during retrieving activities.

25 Claims, 24 Drawing Sheets
(4 of 24 Drawing Sheet(s) Filed in Color)

(56) References Cited

U.S. PATENT DOCUMENTS

| | | | |
|---|---|---|---|
| 5,904,118 A * | 5/1999 | Markham | 119/707 |
| 5,911,197 A | 6/1999 | Schmid | |
| 6,073,581 A * | 6/2000 | Wang | 119/51.01 |
| 6,098,571 A * | 8/2000 | Axelrod et al. | 119/707 |
| D453,864 S * | 2/2002 | Olivares et al. | D30/160 |
| 6,360,693 B1 | 3/2002 | Long, III | |
| 6,405,681 B1 * | 6/2002 | Ward | 119/707 |
| 6,415,741 B2 * | 7/2002 | Suchowski et al. | 119/711 |
| 6,505,577 B1 | 1/2003 | Putnam | |
| D473,683 S | 4/2003 | Willinger | |
| 6,578,527 B1 * | 6/2003 | Mathers | 119/707 |
| D479,897 S * | 9/2003 | Willinger | D30/160 |
| 6,651,590 B2 * | 11/2003 | Willinger et al. | 119/707 |
| 6,681,721 B1 * | 1/2004 | Buschy | 119/709 |
| 6,708,649 B1 * | 3/2004 | Lalor | 119/709 |
| 6,805,077 B2 | 10/2004 | Goldman | |
| 6,840,197 B1 * | 1/2005 | Trompke | 119/711 |
| 6,899,059 B1 * | 5/2005 | Crane et al. | 119/711 |
| D508,592 S * | 8/2005 | Winkler | D30/160 |
| 6,994,055 B1 * | 2/2006 | Bell | 119/709 |
| D517,752 S | 3/2006 | Byrne | |
| 7,100,539 B2 | 9/2006 | Levan | |
| 7,146,934 B1 | 12/2006 | Staley | |
| D544,154 S * | 6/2007 | Bidinger | D30/160 |
| 7,367,283 B2 * | 5/2008 | Aboujaoude et al. | 119/707 |
| 7,574,978 B1 * | 8/2009 | Peterson | 119/709 |
| 7,631,613 B2 * | 12/2009 | Lescroart | 119/51.01 |
| 7,665,423 B2 * | 2/2010 | Ritchey et al. | 119/707 |
| 7,971,556 B2 | 7/2011 | Wechsler | |
| 7,976,355 B2 | 7/2011 | McAnulty | |
| 8,220,418 B1 * | 7/2012 | Tsengas | 119/707 |
| 8,322,308 B2 * | 12/2012 | Curry et al. | 119/707 |
| 8,453,608 B2 * | 6/2013 | Lind | 119/707 |
| 8,474,410 B2 * | 7/2013 | Oblack et al. | 119/709 |
| D690,376 S * | 9/2013 | Silverglate | D21/712 |
| 8,522,725 B1 * | 9/2013 | Moore | 119/711 |
| 2001/0022159 A1 * | 9/2001 | Zangle et al. | 119/707 |
| 2002/0124811 A1 | 9/2002 | Willinger et al. | |
| 2002/0174838 A1 * | 11/2002 | Crane et al. | 119/707 |
| 2003/0131803 A1 * | 7/2003 | Willinger et al. | 119/707 |
| 2004/0211369 A1 | 10/2004 | Wechsler | |
| 2005/0120972 A1 * | 6/2005 | Aboujaoude et al. | 119/707 |
| 2006/0162672 A1 | 7/2006 | Dokken | |
| 2007/0044728 A1 | 3/2007 | Block | |
| 2007/0234969 A1 | 10/2007 | Lynch | |
| 2008/0141948 A1 | 6/2008 | Renforth et al. | |
| 2009/0101078 A1 | 4/2009 | Dobihal | |
| 2009/0114166 A1 * | 5/2009 | Saborio et al. | 119/702 |
| 2009/0151643 A1 | 6/2009 | Hodgins | |
| 2010/0147227 A1 | 6/2010 | Lind | |
| 2010/0180833 A1 | 7/2010 | Ohms | |
| 2011/0094450 A1 | 4/2011 | Chamberlain | |
| 2011/0232581 A1 | 9/2011 | Gick | |
| 2011/0277695 A1 | 11/2011 | Smith | |
| 2013/0055965 A1 * | 3/2013 | Valle et al. | 119/710 |
| 2013/0074780 A1 * | 3/2013 | Wechsler | 119/710 |
| 2013/0167779 A1 * | 7/2013 | Axelrod et al. | 119/707 |

OTHER PUBLICATIONS www.jwpet.com; Aug. 8, 2012; 2 pgs.
www.racksandstands.com; Mar. 27, 2012; 2 pgs.
The Gourdo—Rubber Dog Toy by Ruff Wear; believed published before Apr. 8, 2011; 1 pg.

* cited by examiner

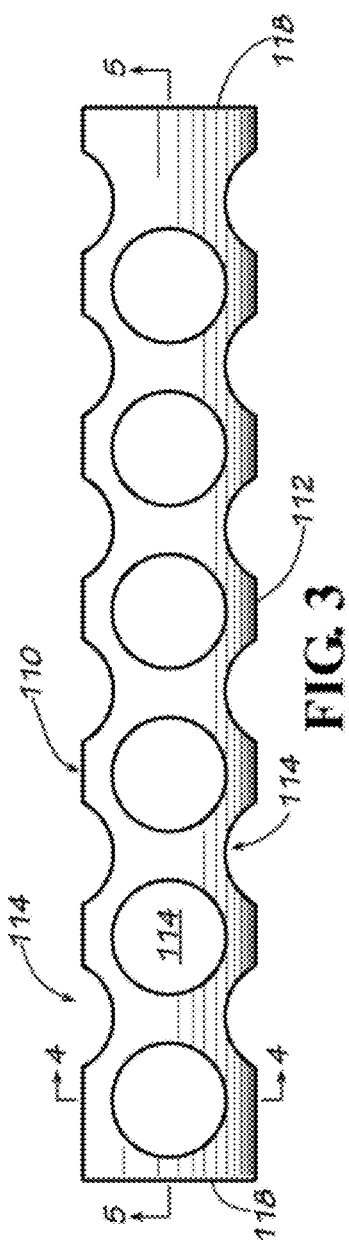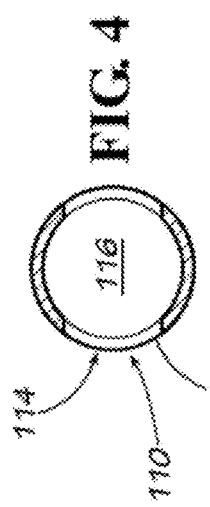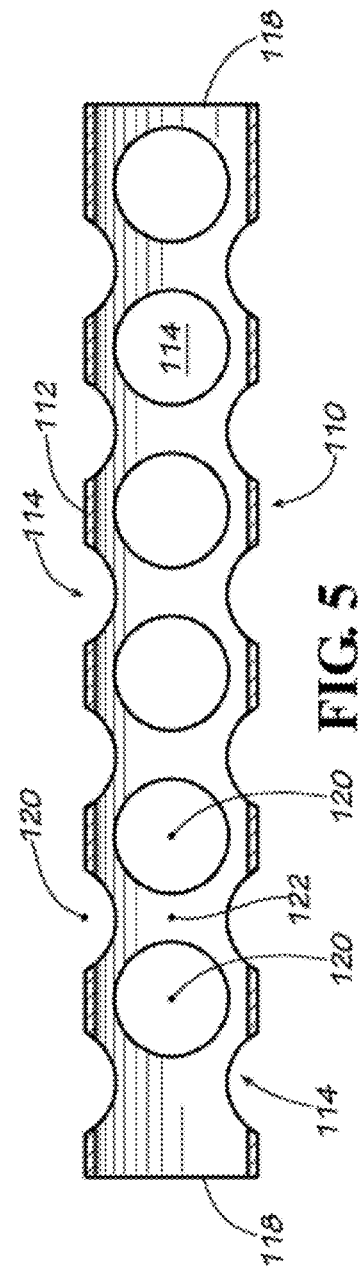

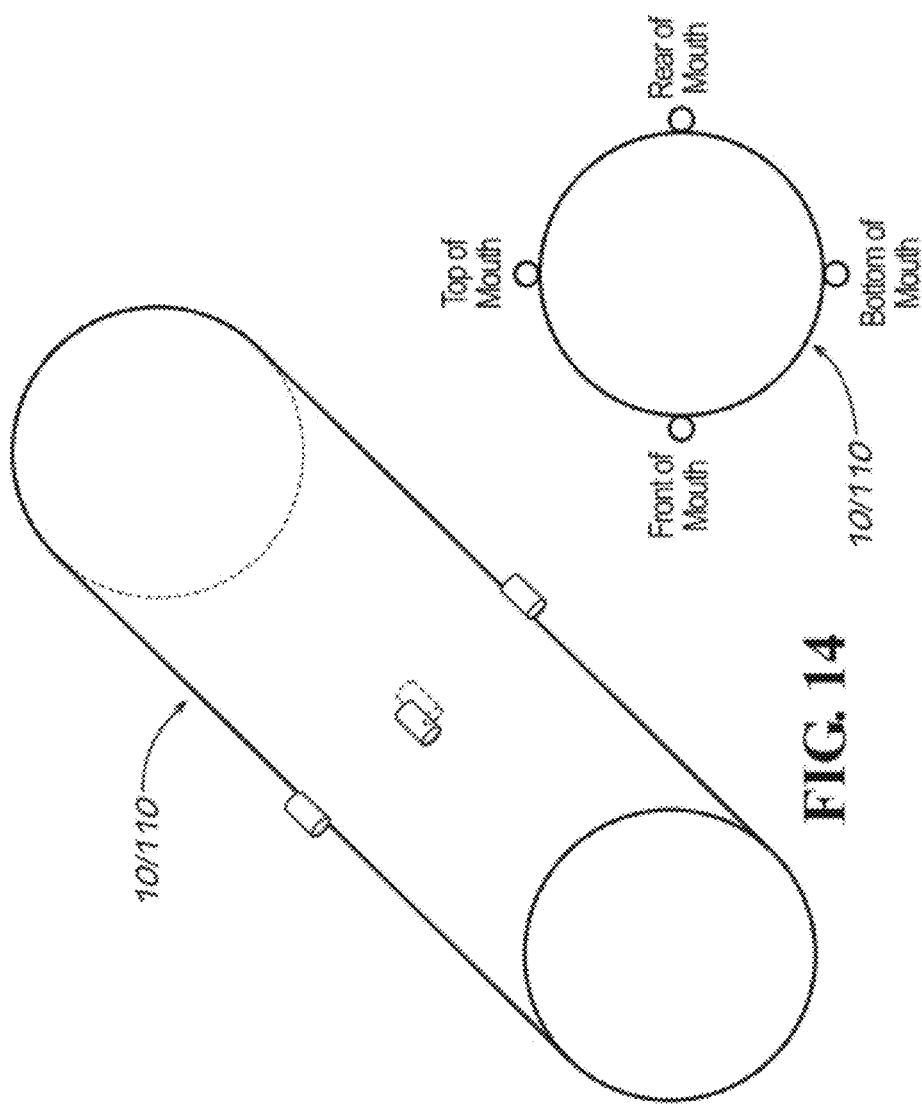

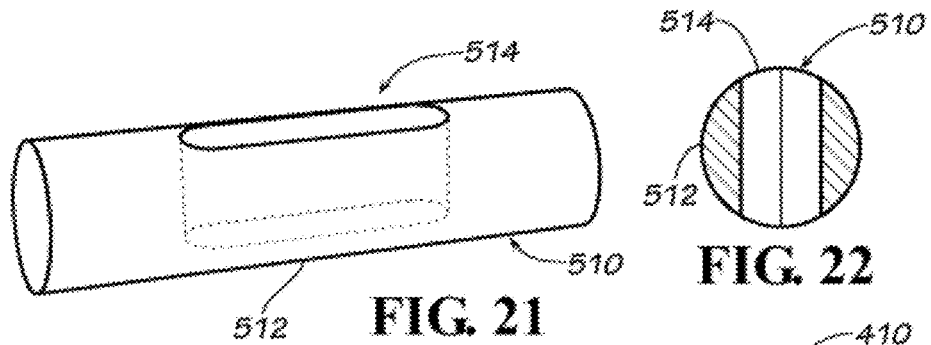
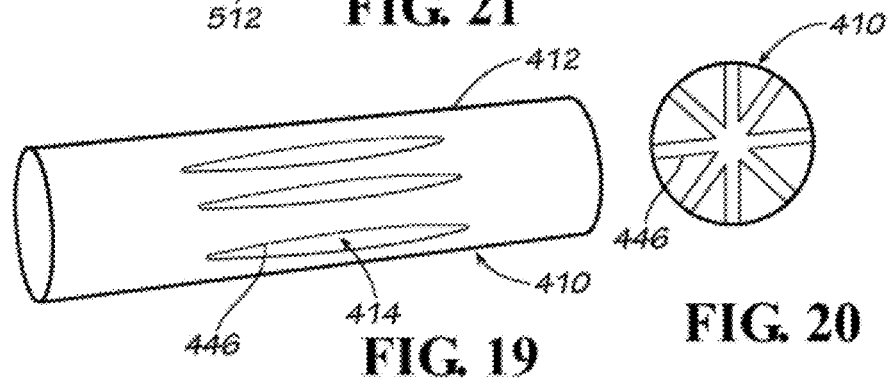
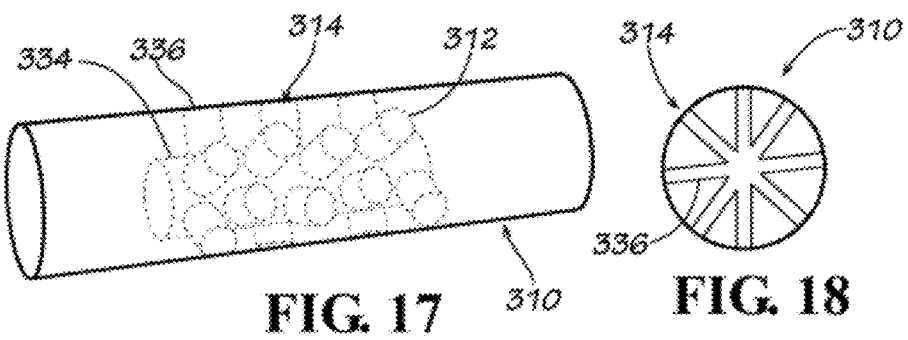
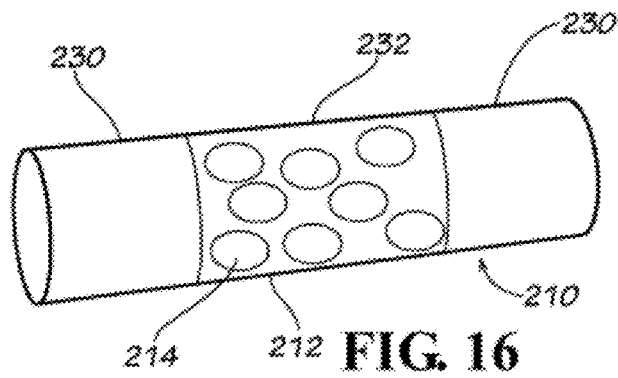

BREATHABLE RETRIEVING DEVICE

CROSS-REFERENCE TO RELATED APPLICATIONS

This application claims the priority benefit of U.S. Provisional Patent Application Ser. No. 61/473,304 filed Apr. 8, 2011, and U.S. Provisional Patent Application Ser. No. 61/608,689 filed Mar. 9, 2012, the entireties of which are hereby incorporated herein by reference for all purposes.

TECHNICAL FIELD

The present invention relates generally to the field of retrieving devices for animals, and more particularly to devices for training canines to retrieve downed game when hunting.

BACKGROUND

Introduction

Retrieving devices are commonly used for training hunting canines to retrieve downed game, and are commonly referred to as "bumper bars" or just "bumpers." Conventional bumpers come in two basic designs: traditional cylindrical dummies and dead fowl dummies. Cylindrical dummies are solid-walled objects made of rubber, plastic, or canvas, typically about 12 inches long and about 1 to 4 inches in diameter. Dead fowl dummies are solid-walled objects shaped and painted to resemble deal fowl. In use, a trainer launches a bumper out to a spot as much as about 800 yards away from a dog, and the dog retrieves the bumper while holding the bumper in its mouth, then the launch-and-retrieve process is repeated a number of times during a training sessions.

Repeatedly retrieving a bumper during a training session is rigorous exercise for a dog. During such exercise, dogs can produce heat at a rate about 50 to 80 times higher than their resting metabolic rate, and their oxygen uptake can be increased up to about 15 times its resting value. Some researchers have reported that in order for dogs to compensate for the increase in heat production and oxygen uptake, dogs increase their respiratory rate from about 36 breaths per minute (bpm) to over 270 bpm. When a dog is under heat stress, its respiratory airflow path changes so that inhalation and exhalation occur through the mouth in addition to through the nose to increase its ventilatory rate and capacity. Evaporation from the upper respiratory tract constitutes the primary means of heat loss for dogs when they are under heat stress. Researchers have shown that dogs are able to increase heat loss by exhaling primarily through the mouth, where two of the major three (nasal, buccal, and lingual) evaporative surface areas are located.

Conventional bumpers retard the ability of the buccal (mouth) and lingual (tongue) surface areas to participate in thermoregulatory evaporation mechanisms. This is because when a dog holds a bumper in its mouth, the dog's lips tend to form a seal around the bumper, thereby restricting airflow over the buccal and lingual surface areas. In particular, the lips seal around the bumper to block airflow through the sides of the dog's mouth and through most of the front of the mouth, with the tongue filling most of the bottom gap between the bumper and the bottom of the mouth and with only the circuitous top passageway/gap between the bumper and the roof of the mouth unobstructed for airflow. One such conventional bumper 10 is shown in FIG. 1, with FIG. 2 showing the same bumper held in a dog's mouth restricting airflow through the mouth to only that top portion of the mouth between the bumper and the roof (as indicated by the directional arrows). In addition, because conventional bumpers significantly block airflow through the dog's mouth during retrieving activities, their use can decrease gas exchange, and can increase cardiac output, intra-thoracic pressure, and psychological stress. As a result, when retrieving conventional bumpers, dogs are subject to overheating (thermal stress), cardiopulmonary stress, and psychological stress.

Heat Exchange

The onset of panting is marked by a change from closed-mouth (breathing through the nostrils only) to open-mouth respiration (additionally breathing through the mouth), and by a sudden increase in the respiratory frequency from about 36 bpm to as much as about 270 bpm. Researchers have found that panting is responsible for most of the heat loss by dogs, and that most of that heat loss occurs in the mouth during panting, and accordingly that breathing through the mouth is an important thermoregulatory mechanism during canine exercise. High body temperatures are associated with high rates of blood flow in the nasal passages, oral passages, and tongue, areas that are being cooled by evaporation. Also, research studies involving blood flow have shown that when a dog's body is heated, blood flow to the nose, mouth, and tongue rises as breathing frequency increases. Studies have revealed that when a dog is under thermal stress, salivation and lingual blood-flow increases dramatically. In addition, lingual arteriovenous temperature differences increase during thermal stress, which indicates that heat is being lost. Studies on dogs exercising in the heat have shown that the rate of respiratory evaporation is related to the elevation in body temperature. That is, if the rate of respiratory evaporation decreases, body temperature increases.

The main mechanism for heat exchange in dogs to keep their brains cool includes in a small network of arteries, called the carotid rete, which is surrounded by venous blood that drains the nasal and oral passages. Warm blood in the arteries loses heat to the venous blood, which is cooled by evaporation in the nose and mouth. When dogs are panting, evaporation from the nose and mouth is increased and the brain is kept cooler than other deep-body regions. Since the brain is sensitive to and adversely affected by overheating, and thermoregulation at the level of the carotid rete is important for cooling of the brain, it is important that dogs be allowed to pant freely and that air be allowed to flow freely over the major evaporative surfaces of the mouth.

The increase in respiratory evaporative heat loss during exercise may be due to the change in the pattern of breathing as well as the increased ventilation rate. The changed pattern of breathing is inhalation and exhalation through both the mouth and nose (instead of just through the nose). The recruitment of the additional evaporative surface of the mouth during exercise may explain part of the increased evaporative heat loss. Venous blood draining from the oral and nasal cavities can drain into the cranial cavity, where it comes in close contact with cerebral arterial blood. Researchers have found that the acceleration of respiratory evaporation during exercise, which would lead to maximum cooling of the nasal and oral venous blood, allows a high rate of heat exchange in the carotid rete of the dog and significant cooling of the brain. In addition, normal brain functions start to become disturbed at temperatures of about 4 C above normal, and cooling the brain more than about 1 C below the temperature of the blood in the body core could increase a dog's exercise tolerance significantly. In other words, not only does hyperthermia endanger brain function, it's also a limiting factor to canine performance.

Gas Exchange

During strenuous exercise, a dog's oxygen uptake can be increased up to about 15 times its at-rest value. Gas exchange is important for waste removal from, and oxygen delivery to, working muscles. Conventional bumpers significantly obstruct the upper airway system and decrease the dog's ability to inhale and exhale efficiently. In addition, conventional bumpers retard the dog's ability to use natural breathing patterns through the nose and mouth. This can decrease gas exchange and thereby increase the onset of fatigue and increase psychological stress.

Cardiac Output and Intrathoracic Pressure

Dogs exercising at workloads of about 4 to 10 times the resting metabolic rate in relatively hot environments have higher cardiac outputs than dogs exercising in cooler environments. The increment in cardiac output in dogs exercising in the heat can be accounted for by increased rates of flow to the respiratory muscles and the evaporative surfaces of the nose, mouth, and tongue. Increased blood flow to the respiratory muscles probably accounts for most of the elevation in cardiac output. This is because of the mass of the respiratory muscles and their increased blood flow during panting. The increase in blood flow to the respiratory muscles is to facilitate oxygen delivery and waste removal from these muscles as they work to force the lungs to exchange air with the environment. The exchange of air facilitates body heat and carbon dioxide removal as well as oxygen intake. During moderate-to-strenuous exercise, a dog's pant rate can increase to over 200 times per minute (over 3 times per second). And researchers have found that with heat stress not only does panting frequency increase, but also the intensity of panting increases (measured by the amplitude of intrathoracic pressure variations). This means that conventional bumpers increase intrathoracic pressure by forcing the dog to push large volumes of air through the small airways of the nostrils and adjacent the roof of the mouth instead of the larger airway of the mouth (the larger the airway, the less force required to exhale and inhale through it). In addition, this may cause the respiratory muscles to increase force output, burn more energy, increase oxygen demand, and increase heat production in the thoracic cavity. In order to meet these demands, the strain on the cardiovascular system significantly increases. Thus, the use of conventional bumpers increases the thermal, respiratory, cardiac, and psychological stress on the dog.

Psychological Stress

When dogs have difficulty breathing while holding conventional bumpers in their mouths during training, this may cause them psychological stress. This is because when the trainer/owner places great physical demands on the dog, this can increase psychological stress and discomfort to the dog.

Conclusion

The use of conventional bumpers decreases a dog's ability to dissipate heat and to efficiently exchange oxygen and carbon dioxide, and increases cardiac output, intra-thoracic pressure, and psychological stress. Accordingly, it can be seen that needs exist for improvements to retrieval bumpers to decrease the thermal and psychological stress on the dog and to make the retrieving activity more comfortable, fun, and safe for the dog. It is to the provision of solutions meeting these and other needs that the present invention is primarily directed.

SUMMARY

Generally described, the present invention relates to retrieving devices and methods such as those used in training hunting dogs to retrieve downed game. The retrieving devices each include a body with at least one respiratory passageway formed in it through which a dog can breathe when holding the device in its mouth during retrieval. In some embodiments, the body is hollow and in the form of a shell defining an internal cavity that functions as a lateral respiratory passageway, with communicating respiratory passageways formed through the shell. In other embodiments, the body is solid with internal respiratory passageways formed through it. And in still other embodiments, the body has surface features (e.g., circumferential or lateral/longitudinal/axial grooves, spiral grooves, or other thinned portions) that function as external respiratory passageways. In use, the respiratory passageways decrease obstructions to enable the dog to breathe more freely to avoid overheating and associated problems. In addition, one or more flotation elements can be provided in the body to provide buoyancy for the retrieving device in the event it's launched into water (e.g., a lake or pond) during retrieving activities.

These and other aspects, features, and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of example embodiments of the invention, and are not restrictive of the invention, as claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 is a side view of a retrieving device according to a first example embodiment of the invention.

FIG. 4 is a cross-sectional view of the retrieving device taken at line 4-4 of FIG. 3.

FIG. 5 is a cross-sectional view of the retrieving device taken at line 5-5 of FIG. 3.

FIG. 13 is an end view showing four temperature-sensing positions of the conventional and new bumpers of FIGS. 1-2 and 3-6, used during a mouth-temperature evaluation.

FIG. 14 is a perspective view of the temperature-sensing positions of FIG. 13.

FIG. 16 is a perspective view of a retrieving device according to a second example embodiment of the invention.

FIG. 17 is a perspective view of a retrieving device according to a third example embodiment of the invention.

FIG. 18 is a cross-sectional view of the retrieving device of FIG. 17.

FIG. 19 is a perspective view of a retrieving device according to a fourth example embodiment of the invention.

FIG. 20 is a cross-sectional view of the retrieving device of FIG. 19.

FIG. 21 is a perspective view of a retrieving device according to a fifth example embodiment of the invention.

FIG. 22 is a cross-sectional view of the retrieving device of FIG. 21.

DETAILED DESCRIPTION OF EXAMPLE EMBODIMENTS

Figure 1:
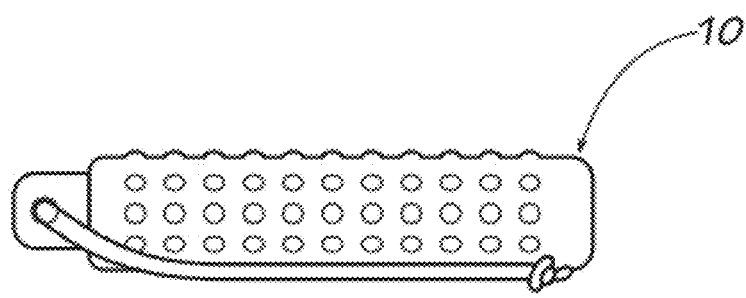
FIG. 1 is a side view of a conventional retrieving device according to the prior art.

The present invention may be understood more readily by reference to the following detailed description of example embodiments taken in connection with the accompanying drawing figures, which form a part of this disclosure. It is to be understood that this invention is not limited to the specific devices, methods, conditions, or parameters described and/or shown in the specification and drawing figures, and that the terminology used in the specification is for the purpose of describing particular embodiments by way of example only and is not intended to be limiting of the claimed invention. Any and all patents and other publications identified in the specification are incorporated by reference as though fully set forth herein.

Also, as used in the specification and the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Generally described, the present invention relates to new retrieving devices and methods such as those for use in training hunting dogs to retrieve downed game such as flying wildfowl or other animals (e.g., dove, duck, geese, and squirrel). While these new retrieving devices are described herein with respect to training wildfowl hunting dogs, they can be used as is, or modified using ordinary skill in the art, for retrieving other types of game, for retrieval play or amusement for pet dogs, for retrieval activities for other types of animals, or for chewing on (without retrieving) in a hot environment. As used herein, the terms "retrieving device" and "bumper" are used interchangeably and have the same meaning.

The new bumpers include a body defining one or more respiratory passageways through it that provide a safer and more comfortable retrieving experience for dogs and that allow for efficient air exchange with the external environment. Even with the respiratory passageways, however, the body still has structural integrity sufficient for its intended purpose of being held securely in a dog's mouth while being retrieved. For example, the body can be made of a hard or soft plastic, polyvinyl chloride (PVC), wood, rubber, polyurethane, or other conventional material. For embodiments in which the body is an elongated element, the body can have a cross-sectional or end profile that is circular (i.e., a cylindrical body), oval, triangular, square or in another rectangular shape, hexagonal or in another polygonal shape, or in another regular or irregular shape. In other embodiments, the body is spherical, ovoidal, or has another regular or irregular shape such as a dead-fowl-mimicking shape. The thickness of the body is typically in the range of about 0.5 inch to about 4 inches, and the length of the body is typically in the range of about 3 inches to about 12 inches, with the size selected based on the size of the dog doing the retrieving. The body can be hollow and form a shell defining a cavity forming a lateral internal respiratory passageway with communicating respiratory passageways formed through the shell, or the body can be solid with internal respiratory passageways defined by conduits in the solid body. The internal respiratory passageways can have cross-sectional profiles that are circular, oval, triangular, square or in another rectangular shape, hexagonal or in another polygonal shape, or in another regular or irregular shape. In some embodiments, the respiratory passageways are formed by external surface features of the body such as circumferential or lateral/longitudinal/axial grooves, spiral grooves, or other thinned portions. The external respiratory passageways can have cross-sectional profiles that are U-shaped, V-shaped, W-shaped, or that have another regular or irregular notched or recessed shape. In some embodiments, the body is provided by latticed or tessellated shell or frame to form the respiratory passageways.

The respiratory passageways increase the functional abilities of the bumpers to decrease airway obstruction and allow airflow over important thermoregulatory surfaces of the mouth. In some embodiments, the new bumpers provide for an effective breathable mouth surface area increased by about 20-80% over conventional bumpers. In addition, some embodiments include features for improved gripping in the mouth, for encouraging gripping a designated portion of the bumpers with the mouth, and/or for flotation for use near or in water.

With reference now to the drawing figures, wherein like reference numbers represent corresponding parts throughout the several views, FIGS. 3-6 show a bumper 110 according to a first embodiment of the invention. The bumper 110 includes a body 112 that defines respiratory passageways 114 through which the dog can breathe while the bumper is held in its mouth during retrieving activities. The body 112 is generally cylindrical and hollow, and it thus has the form of a shell or sidewall defining an internal cavity 116. The body 112 can be made of a rigid material selected for structural strength sufficient to prevent the body from collapsing the internal respiratory passageways and also sufficient to resist the chewing action of the dog's teeth on the exterior surface, but with some flexibility, such as hard plastic, rubber, a thermoplastic elastomer, or the like. In typical embodiments, for example, the body 112 is made of PVC or polyurethane with a wall thickness of about 0.25 inch and with a durometer of about 60 A. The body 112 can be coated (e.g., by dipping) with a thin layer of a soft material such as a rubber or soft plastic to provide for better gripping by and more comfort against the dog's teeth. Or the body 112 can be integrally made of a single material that provides the desired strength and softness properties. In typical embodiments, the body 112 has a length of about 12 or 13 inches and a diameter of about 1 to about 4 inches, depending on the size of the dog using the bumper 110. The body 112 has open ends 118 and as such is tubular, with the internal cavity 116 forming a lateral respiratory passageway, and the body has at least two radial openings formed through the sidewall cooperatively defining a side-to-side respiratory passageway. In this way, the side-to-side respiratory passageway and the lateral respiratory passageway cooperatively define an airflow path through which the animal can breathe laterally (out of the sides of the dog's mouth). And the side-to-side respiratory passageway defines a front airflow path through which the animal can front-breathe (out of the front of the dog's mouth).

The respiratory passageways 114 of the depicted embodiment are positioned in an array, in an overlapping but staggered offset arrangement. That is, for each series of passageways 114 spaced along the length of the body 112, the two adjacent series of passageways 114 are staggered and longitudinally offset, with the center of each passageway positioned so that it is not in circumferential alignment (i.e., in a direction around the circumference of the cylindrical body, not along its length or axis—for non-cylindrical bodies the term "circumferential" is intended to mean "peripheral" in the same plane) with the center of any passageway in either of the two circumferentially adjacent series of passageways. In this arrangement, the passageways are closely packed together to provide a large breathable/open surface area in the sidewall of the body 112. In the depicted embodiment, for example, the center 120 of each circular passageway 114 is positioned so that it is in circumferential alignment with a midpoint 122 on the body 112 between the centers 120 of the two adjacent passageways in each circumferentially adjacent series of passageways, with the passageways of each series longitudinally aligned, evenly spaced, and having the same size (see FIG. 5). In this arrangement, the passageways 114 and the cavity 116 enable the dog to breathe through them and through the front and sides of its mouth, regardless of exactly how the dog picks up the bumper 110 and holds it in its mouth. In addition, with this arrangement of the passageways 114, when the dog picks up the bumper 110 and holds it with its teeth, some of the teeth will tend to slot into the passageways to provide for improved gripping in the mouth during retrieving activities.

In typical embodiments, the respiratory passageways 114 are circular with a diameter of about 0.1 inch to about 2.0 inches. For example, in the depicted embodiment there are 24 passageways 114 with a 1.5-inch diameter each and arranged in an array with 6 serial holes evenly spaced along the length of the cylinder and 4 such 6-hole series in the overlapping but staggered offset arrangement. In other embodiments, there are more or fewer of the passageways 114 in larger or smaller sizes (fewer passageways of larger size, or more of smaller size, can be included to provide the same or a different airflow capacity) and/or in other sizes, shapes, and/or arrangements.

The passageways 114 and the cavity 116 enable the dog to breathe through them and thus through the front and sides of its mouth to allow airflow over important thermoregulatory surfaces of the mouth. That is, regardless of exactly how the dog picks up the bumper 110 and holds it in its mouth, there are passageways 114 in a breathable position at the rear of its mouth so that air can flow through them, through the cavity 116, and out breathable-position passageways at the front of its mouth as well as laterally out the body ends 118. In this embodiment, the bumper 110 provides for an effective breathable mouth surface area increased by about 40% over conventional bumpers.

Test Data

Figure 2:
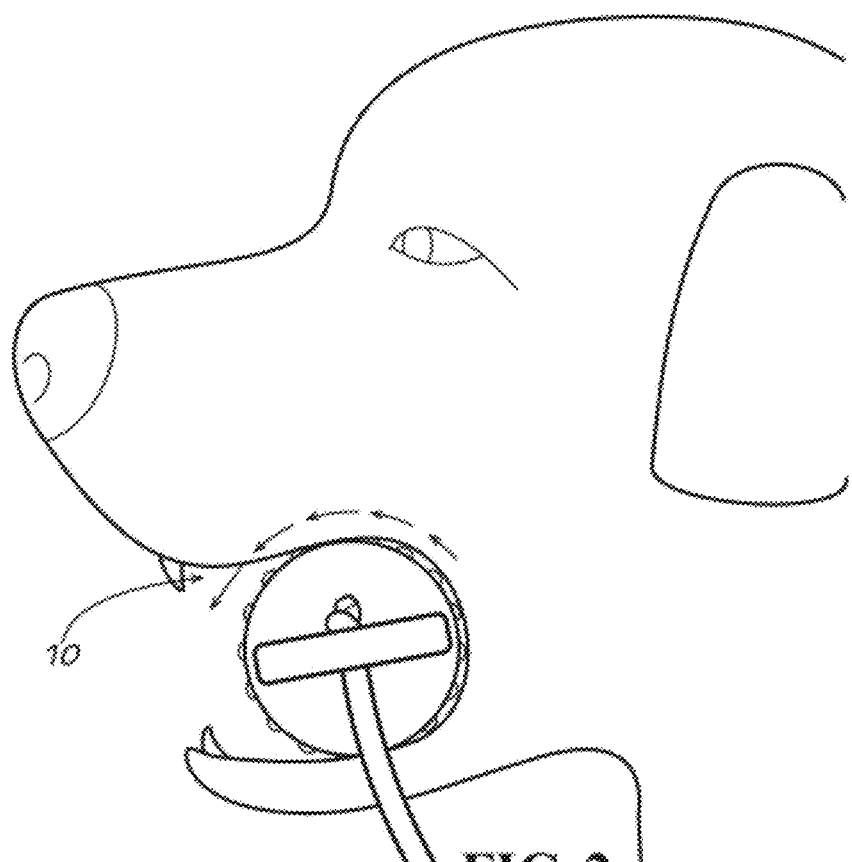
FIG. 2 is an end view of the retrieving device of FIG. 1 in use being held in a dog's mouth.

To evaluate the functional abilities of the bumper 110 of the first embodiment of the invention (the "new bumper"), two studies were conducted. In both studies, comparisons were made between a conventional ("old") bumper 10 and a new bumper 110. The conventional bumper 10 tested was a traditional solid cylindrical bumper, made of a soft rubber material, with a 12-inch length and a 2-inch diameter, as shown in FIGS. 1-2. And the new bumper 110 tested was in accordance with the first embodiment shown in FIGS. 3-6, made of a conventional, cylindrical, hollow, 2-inch diameter piece of polyvinyl chloride (PVC) that was 12 inches long and coated with a thin rubber layer, and that had 24 circular respiratory holes formed into it, with the holes being 1.5 inches in diameter and arranged in an array with 6 serial holes evenly spaced along the length of the cylinder and 4 such 6-hole series in an overlapping but staggered offset arrangement.

In the first study, Schlieren videography was used to evaluate how the flow of air was affected when a dog panted with no bumper, the conventional bumper 10, and the new bumper 110. In the second study, the temperature difference between the conventional bumper 10 and the new bumper 110 was evaluated in four areas of a dog's mouth. All study procedures and methods were approved by the Auburn University Institutional Animal Care and Use Committee.

1. Schlieren Videography Evaluation

The objective of this study was to conduct an evaluation of the airflow coming in and out of the mouth of a dog holding no bumper, holding the conventional bumper 10, and holding the new bumper 110. This study was expected to show that the conventional bumper 10 significantly obstructs the mouth airway of the dog and forces the dog to breathe through only the small upper portion of the mouth between the bumper 10 and the roof of the mouth (as well as through the small nostrils). This test was done to confirm that the new bumper 110 reduces airway obstruction and improves breathing so that the air currents closely resemble those seen in normal panting (i.e., with no bumper in the mouth).

a. Methodology

Figure 6:
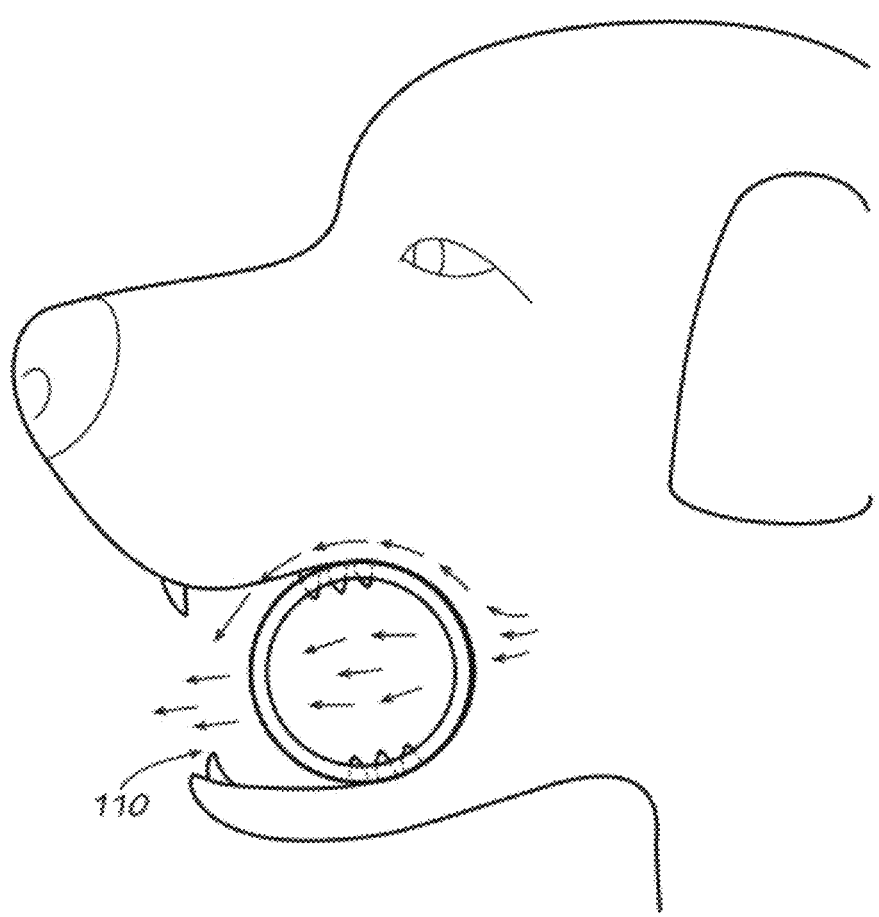
FIG. 6 is an end view of the retrieving device of FIG. 3 in use being held in a dog's mouth.

One dog was conditioned and trained to sit inside a Schlieren system while three breathing treatments were conducted. The breathing treatments consisted of the dog panting with no bumper, holding the conventional bumper 10, and holding the new bumper 110. The bumpers were held by the dog just behind the canine teeth, over the premolar area of the mouth, as shown in FIGS. 2 and 6.

A Schlieren system including a laser light source, two parabolic mirrors, a video camera, and an image screen was used for the evaluation. The light source was aimed at a 30-degree angle into a 10-inch parabolic mirror (Mirror A) that was mounted on a tripod. Mirror A reflected the light from the light source onto a second parabolic mirror (Mirror B) situated 120 inches away. From Mirror B, the light was angled 30 degrees out to an image screen. Between Mirror B and the image screen, a razor blade was inserted into the vertical apex of the converged light beam to block some of the light rays from hitting the image screen. A video camera was used to capture the image that was projected onto the image screen.

The Schlieren system sent a beam of light that was 10 inches in diameter between the two mirrors. When an object such as the dog's mouth enters the beam of light, certain rays of the light are bent and certain rays are blocked. The bending and blocking of the light rays results in the ability to see the air flowing in and out of the dog's mouth and nose. Because of the system's sensitivity to floor vibrations and the requirements of the dog to be in close quarters with the equipment of the system, a calm-demeanor dog was selected and trained to sit in the system. The dog was required to sit with its mouth perpendicular to and in the Schlieren light beam. The dog was on lead and a dog handler sat beside the dog during the data-collection period. Once the dog sat still with its mouth positioned inside the light beam, it was sequentially required to pant for 30 seconds with no bumper in its mouth, with the conventional bumper 10 in its mouth, and with the new bumper 110 in its mouth. The captured video was then placed into a computer for further subjective slow-motion analysis to determine how the airflow in the mouth changed when the dog experienced the three different treatments.

b. Results

Figure 7:
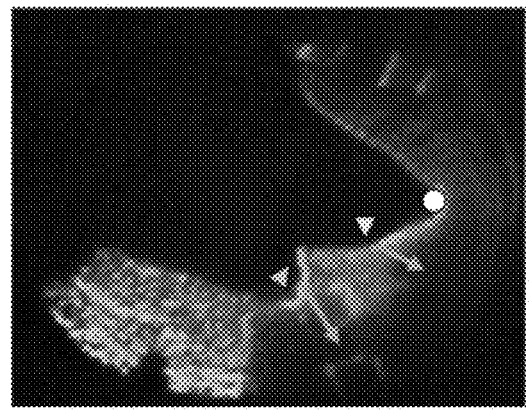
FIG. 7 is an image of a dog's side profile showing normal mouth-breathing airflow when not holding any bumper in its mouth, generated by a Schlieren videography evaluation.
Figure 8:
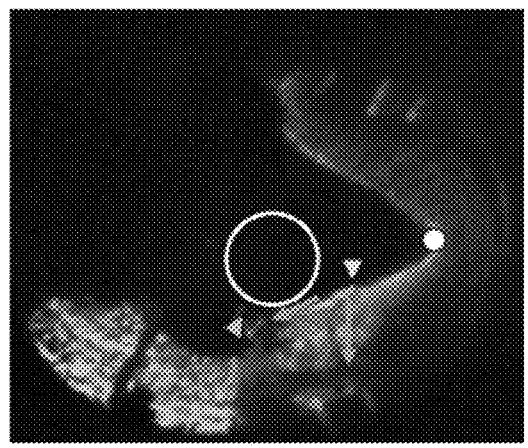
FIG. 8 is an image of the dog's side profile of FIG. 7, showing restricted mouth-breathing airflow when holding the conventional bumper of FIGS. 1-2 in its mouth.
Figure 9:
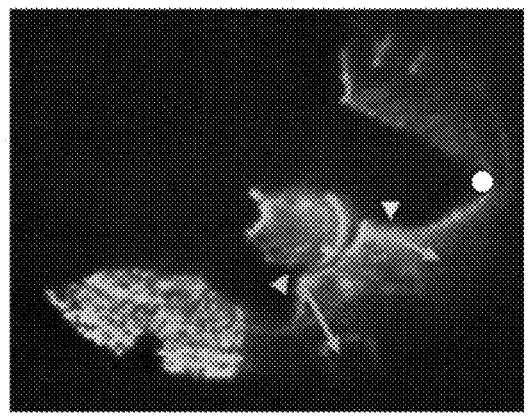
FIG. 9 is an image of the dog's side profile of FIG. 7, showing unrestricted mouth-breathing airflow when holding the new bumper of FIGS. 3-6 in its mouth.
Figure 10A:
FIGS. 10A-D are four sequential images of one breath corresponding to the airflow of FIG. 7.
Figure 10B:
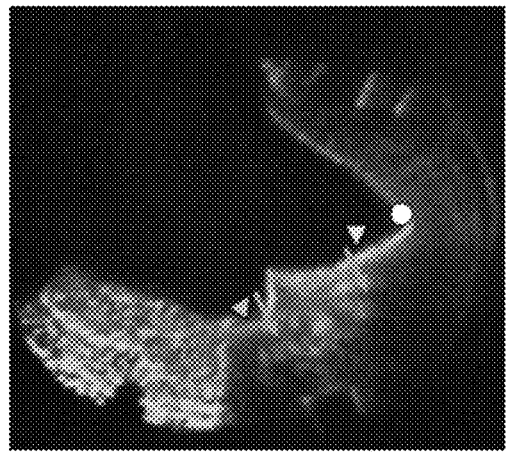
Figure 10C:
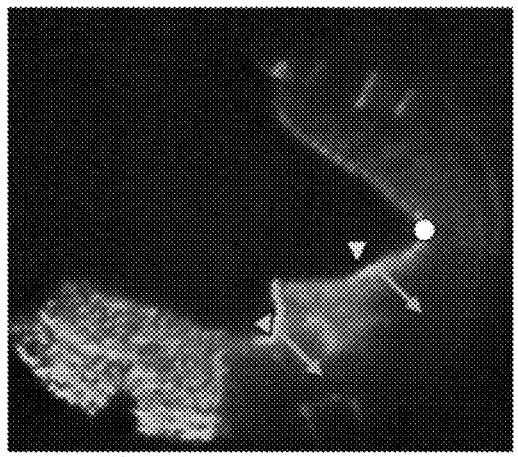
Figure 10D:
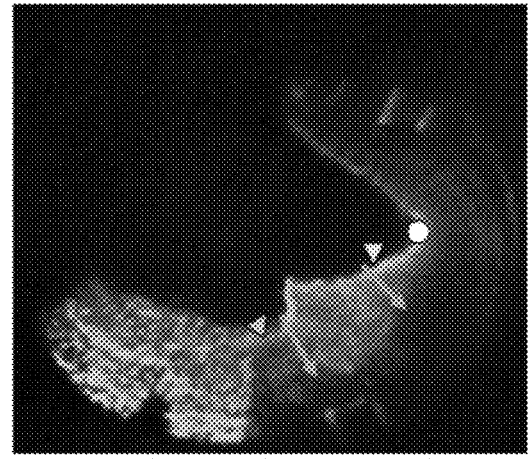
Figure 11A:
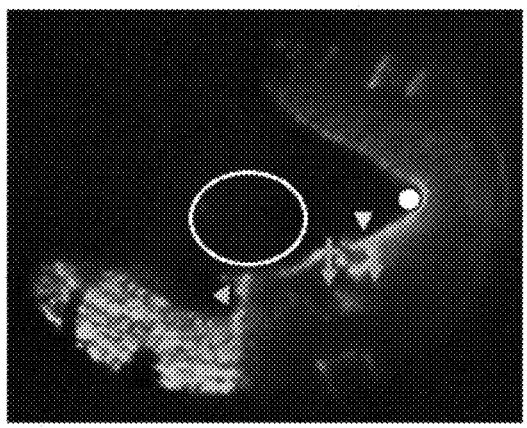
FIGS. 11A-D are four sequential images of one breath corresponding to the airflow of FIG. 8.
Figure 11B:
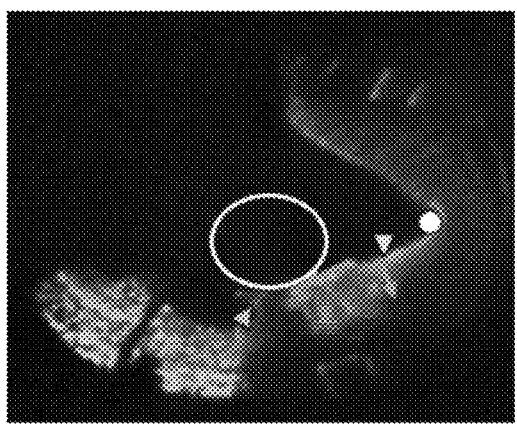
Figure 11C:
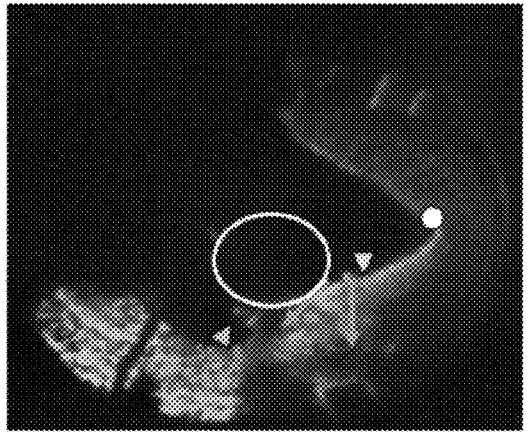
Figure 11D:
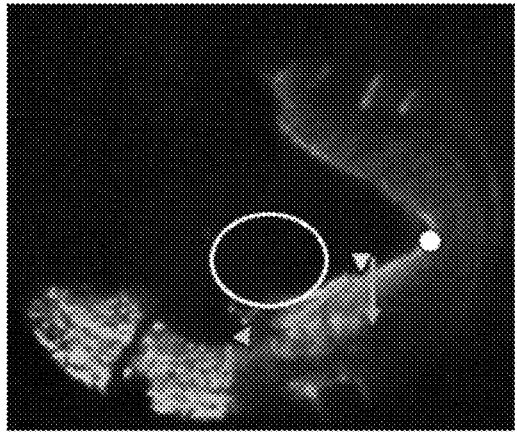
Figure 12A:
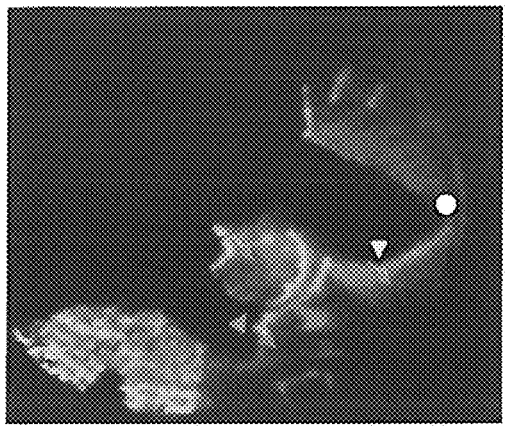
FIGS. 12A-D are four sequential images of one breath corresponding to the airflow of FIG. 9.
Figure 12B:
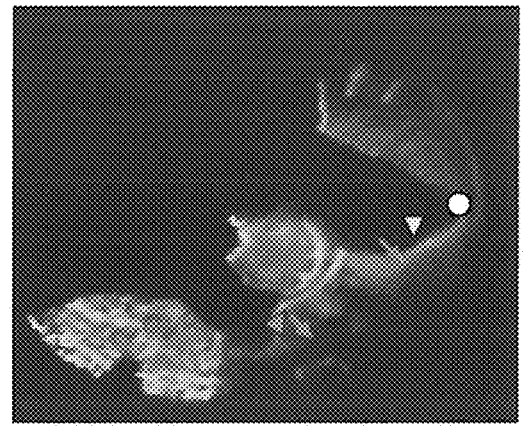
Figure 12C:
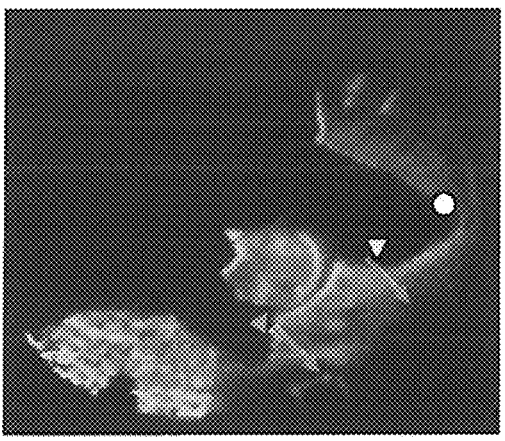
Figure 12D:
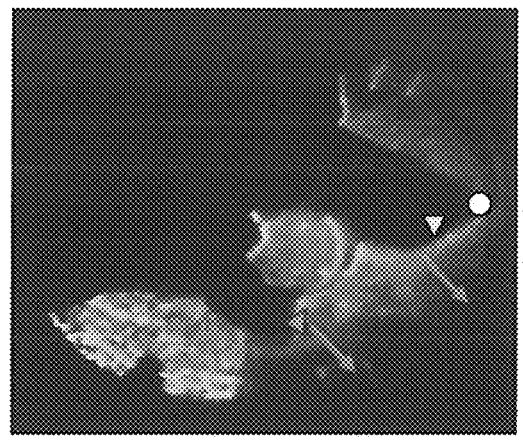

The results of the study show that the dog's mouth airway was significantly obstructed when holding the conventional bumper 10, but that when holding the new bumper 110 the dog's breathing closely resembled normal airflow during panting with no bumper in its mouth. FIGS. 7-12O illustrate the results of this study. These images are all side views of the dog's mouth when the dog was inside the Schlieren system. FIG. 7 illustrates the end state of airflow at the front of the dog's mouth with no bumper, FIG. 8 illustrates this with the conventional bumper 10, and FIG. 9 illustrates this with the new bumper 110. FIGS. 10A-D show consecutive frames A-D of one breath corresponding to the airflow of FIG. 7, FIGS. 11A-D show consecutive frames A-D of one breath corresponding to the airflow of FIG. 9, and FIGS. 12A-D show consecutive frames A-D of one breath corresponding to the airflow of FIG. 9.

As reference points in all of these images, the white dots identify the approximate tip of the dog's nose, the upper/yellow triangles identify the approximate bottom of the upper lip, and the lower/light-blue triangles identify the approximate top of the bottom lip. The red "cloud" in front of the dog's mouth is the air current as imaged by the Schlieren system. And the green arrows delineate the flow of air through the mouth, with the red cloud area between the green lines being the air current coming out of the mouth. The red cloud area under the dog's mouth and next to the throat has no significance; this is noise from the light source.

The red cloud area between the green lines denotes the effective breathing area. The white circle in FIG. 8 identifies the location of the conventional bumper 10, while the outline of the new bumper 110 in FIG. 9 can be readily seen in the red cloud inside the dog's mouth. When the dog panted with no bumper in its mouth, the baseline normal airflow was established, as shown in FIGS. 7 and 10A-D. When the dog panted with the conventional bumper 10 in its mouth, the mouth airway was significantly obstructed and air was only allowed to pass over the top of the bumper 10 and just below the roof of the mouth, as shown in FIGS. 8 and 11A-D. This caused the restricted air through the mouth to pass across the roof of the mouth, hit the upper lip, and be deflected downward across the opening of the mouth such that there was only airflow out of the top of the mouth. When the dog panted with the new bumper 110 in its mouth, the air passed freely through the bumper and out of the front and sides of the mouth, as shown in FIGS. 9 and 12A-D. Thus, it can be readily seen from these images that the effective breathing area for no bumper (FIGS. 7 and 10A-D) and for the new bumper 110 (FIGS. 9 and 12A-D) is practically the same, while the conventional bumper 10 (FIGS. 8 and 11A-D) significantly obstructs the mouth airway and thereby decreases mouth airflow.

2. Mouth Temperature Evaluation

Research has shown that panting is responsible for most of the heat loss in exercising dogs, and that most of that heat loss occurs in the mouth during panting. Other research has shown that breathing through the mouth is an important thermoregulatory mechanism for dogs during exercise. Studies have revealed that when a dog is under thermal stress, salivation and lingual blood flow increase dramatically. In addition, lingual arteriovenous temperature differences increase, indicating that heat is being lost. The main mechanism for heat exchange in the dog to keep the brain cool includes in a small network of arteries, called the carotid rete, which is surrounded by venous blood that drains the nasal and oral passages. Warm blood in the arteries loses heat to the venous blood, which is cooled by evaporation in the nose and mouth. When dogs are panting, evaporation from the nose and mouth increases and the brain is kept cooler than other deep body regions. Since the brain is sensitive to overheating, and thermoregulation at the level of the carotid rete is important for cooling of the brain, it is important that dogs be allowed to pant and that air be allowed to flow over the evaporative surfaces of the mouth. The above-described study using a Schlieren system to evaluate airflow in the mouth shows that this airway is significantly obstructed by conventional bumpers 10 and that air only flows across the roof of the mouth, thereby bypassing important thermoregulatory surface areas (e.g., the tongue).

In order to precisely evaluate the effect of the new bumper 110 on brain temperatures, a very invasive and potentially fatal procedure would have to be performed on a group of dogs. Because of this, a precise evaluation of brain temperatures in dogs using the new bumper 110 was not performed. However, by measuring mouth temperatures during exercise, it can be shown that that the new bumper 110 causes the mouth to be cooler, which will necessarily have an effect on brain cooling. Therefore, the objective of this study was to evaluate the temperature at four sites in the mouth during panting with the conventional bumper 10 and with the new bumper 110. Because the conventional bumper 10 significantly obstructs the dog's mouth airway, this study was expected to show that more heat builds up at least in the rear of the mouth, the bottom of the mouth, and the area in front of the bumper. This heat build-up does not allow for efficient thermoregulatory mechanisms to take place and thereby has an adverse effect on brain cooling.

a. Methodology

Eight healthy field-trail trained Labrador Retrievers were used in this study. The dogs were required to hold the conventional bumper 10 and the new bumper 110 in their mouth while panting. The dogs were divided into two groups of four dogs each. Group 1 dogs received the new bumper 110 first and the conventional bumper 10 second, while Group 2 dogs received the conventional bumper 10 first and the new bumper 110 second. Each dog was required to hold the bumpers in its mouth for at least 1 minute while temperatures where measured. The conventional bumper 10 and the new bumper 110 were each fitted with temperature sensors at four different positions: bottom of mouth (BM), top (roof) of mouth (TM), rear of mouth (RM), and front of mouth (FM), as shown in FIGS. 13-14. Each temperature-sensing position of each bumper had a TMCx-1T-Thermistor, and these were attached to a U12 HOBO data logger. The U12 HOBO data logger took temperature samples from each thermistor every 2 seconds. In addition, ambient air temperature external to the dog was measured with a Quest Technologies Wet Bulb Globe Thermometer. Paired t-tests were used to compare the average temperatures during the 1-minute test periods for the conventional bumper 10 and the new bumper 110.

b. Results

As expected, at three of the four tested positions, the air in the mouth around the sensors on the conventional bumper 10 was significantly hotter than around those on the new bumper 10. The new bumper 10 allowed a more-efficient air exchange over a larger surface area in the mouth and kept the mouth cooler than the conventional bumper 10 did. The very slight temperature decrease at the top of the mouth was attributed to the throttling effect of the airflow rate being increased by the bumper obstruction.

Table 1 shows the results of the test, listing the statistical temperature values (in degrees F.) for the conventional or old bumper 10 and for the new bumper 110. The table lists the mean values, standard deviations, differences of means, and p values for the for four locations of bottom of mouth (BM), top of mouth (TM), rear of mouth (RM), and front of mouth (FM), averaged over one minute of panting. The ambient temperature values during the testing period ranged from 30.4 F to 31.6 F.

TABLE 1

| Old Bumper 10 Mean ± SD | | New Bumper 110 Mean ± SD | | Difference of Means | p value |
|---|---|---|---|---|---|
| RM | 81.8 ± 4.2 | RM | 77.0 ± 4.2 | 4.8 | 0.049 |
| BM | 81.0 ± 5.5 | BM | 69.7 ± 10 | 11.24 | 0.043 |
| FM | 53.6 ± 5.4 | FM | 48.7 ± 6.8 | 4.8 | 0.12 |
| TM | 87.5 ± 6.0 | TM | 62.1 ± 5.2 | 25.3 | <0.001 |

Figure 15:
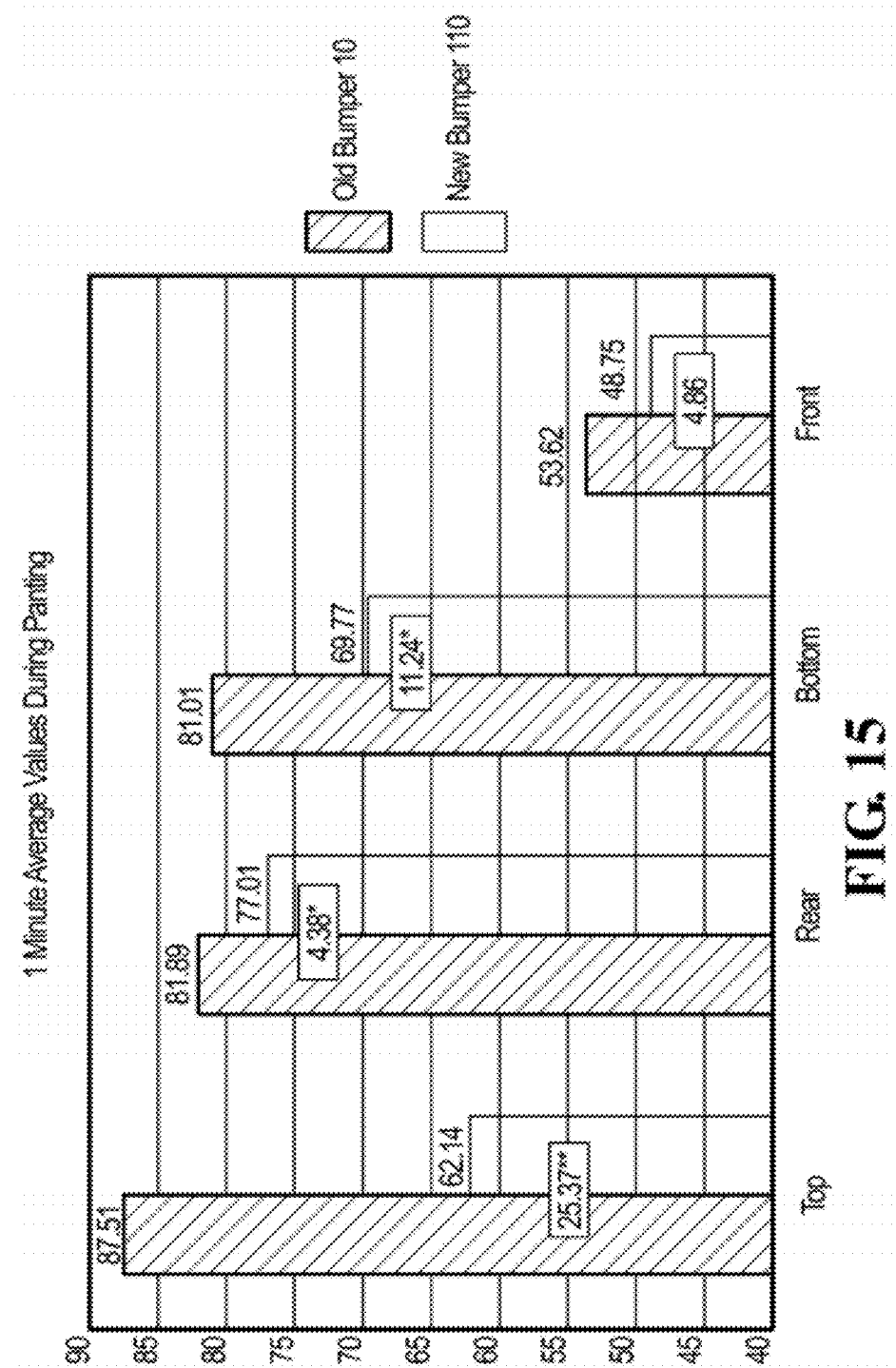
FIG. 15 is a chart showing the test results of the mouth-temperature evaluation using the temperature-sensing positions of FIG. 13.

In addition, the mean differences listed in Table 1 are represented graphically in the chart of FIG. 15.

3. Conclusion of Studies

Both the Schlieren and temperature evaluations showed that conventional bumpers 10 significantly obstruct the airflow in the mouth and have significant adverse effects on mouth temperatures. This has a direct effect on the cardiopulmonary systems and the dog's ability to cool the brain. Because of the obstruction, more force is needed from the respiratory system to force the air through the narrow top gap between the old bumper 10 and the roof of the mouth. This may decrease the ability of the respiratory system to efficiently exchange oxygen and carbon dioxide, or it may not impair gas exchange but rather may increase cardio respiratory strain. On the other hand, during respiration air flows freely and easily through the new bumper 110, which provides less resistance by providing for a larger effective breathing area and reducing the amount of force required by the respiratory system to force air into and out of the mouth. Thus, the new bumper 110 allows for efficient breathing by not obstructing the mouth airway, and thereby places less strain on the respiratory system. In addition, the new bumper 110 allows air to flow over important thermoregulatory areas such as the tongue to help dissipate heat.

Cardiac output increases in exercising dogs and can be accounted for by increased rates of blood flow to the respiratory muscles and the evaporative surfaces of the nose, mouth, and tongue. Researchers believe that during exercise there is an increase in cardiac output to the respiratory muscles. This is because of the mass of the respiratory muscles and their increased blood flow during panting. The increase in blood flow to the respiratory muscles is needed to facilitate oxygen delivery and waste removal from these muscles as they work to force the lungs to exchange air with the environment. The exchange of air facilitates body heat and carbon dioxide removal as well as oxygen intake. Because the Schlieren study showed that the conventional bumper 10 obstructs airflow, this leads to the conclusion that these bumpers increase intra-thoracic pressure by forcing the dog to push large volumes of air through the smaller opening left adjacent the roof of the mouth instead of the larger entire airway of the mouth (the larger the airway, the less force required to exhale and inhale the air). In addition, this may cause the respiratory muscles to increase force output, burn more energy, increase oxygen demand, and increase heat production in the thoracic cavity. Therefore, the strain on the cardiovascular system increases in order to meet these demands. Thus, the use of conventional bumpers 10 can increase the thermal, respiratory, cardiac, and psychological stress on the dog. The new bumper 110 solves these issues by providing for a larger breathable mouth surface area that reduces the force needed by the lungs to exchange air.

The recruitment of the additional evaporative surfaces of the mouth during exercise may explain part of the increased heat loss during panting. Venous blood draining from the oral and nasal cavities can drain into the cranial cavity where it comes in close contact with cerebral arterial blood. Research shows that the acceleration of respiratory evaporation during exercise, which would lead to maximum cooling of the nasal and oral venous blood, allows a high rate of heat exchange in the carotid rete of the dog and significant cooling of the brain. In addition, normal brain functions start to become disturbed at temperatures of about 4 C above normal, and cooling the brain more than about 1 C below the temperature of the blood in the body core could increase a dog's exercise tolerance significantly. Not only does hyperthermia endanger brain function, it is also a limiting factor to canine performance. Because the temperature evaluation of the mouth showed that three out of the four measured temperature sites were significantly cooler with the new bumper 110 than with the old bumper 10, the study indicates that the new bumper with its respiratory channels aids in brain cooling, thereby making retrieving activities safer and optimizing performance over conventional bumpers.

Conventional bumpers 10 decrease a dog's ability to dissipate heat and to efficiently exchange oxygen and carbon dioxide. These bumpers 10 also may increase cardiac output, intra-thoracic pressure, work conducted by the respiratory muscles, and psychological stress. All of this endangers the dog and reduces the comfort experienced by the dog during retrieving activities. However, the new bumper 110 with respiratory channels allows for efficient air exchange, which permits the dog to increase brain cooling and efficiently deliver/remove gases. In addition, use of the new bumper 110 can decrease cardiopulmonary strain and psychological stress, thereby making retrieving activities safer and more comfortable and pleasurable for the dog.

Although these two studies were conducted using the conventional bumper 10 described and shown in FIGS. 1-2, similar results can be logically expected using other conventional bumpers having dead-fowl designs and other sizes of cylindrical designs, because they all have generally cylindrical, solid-walled designs. It can even be expected that the dead-fowl design might restrict airflow through the mouth even worse, because its slightly bowed-out shape could leave an even smaller top gap between the bumper and the roof of the mouth. Furthermore, similar results can be logically expected using any of the other new bumpers described herein.

Figure 34:
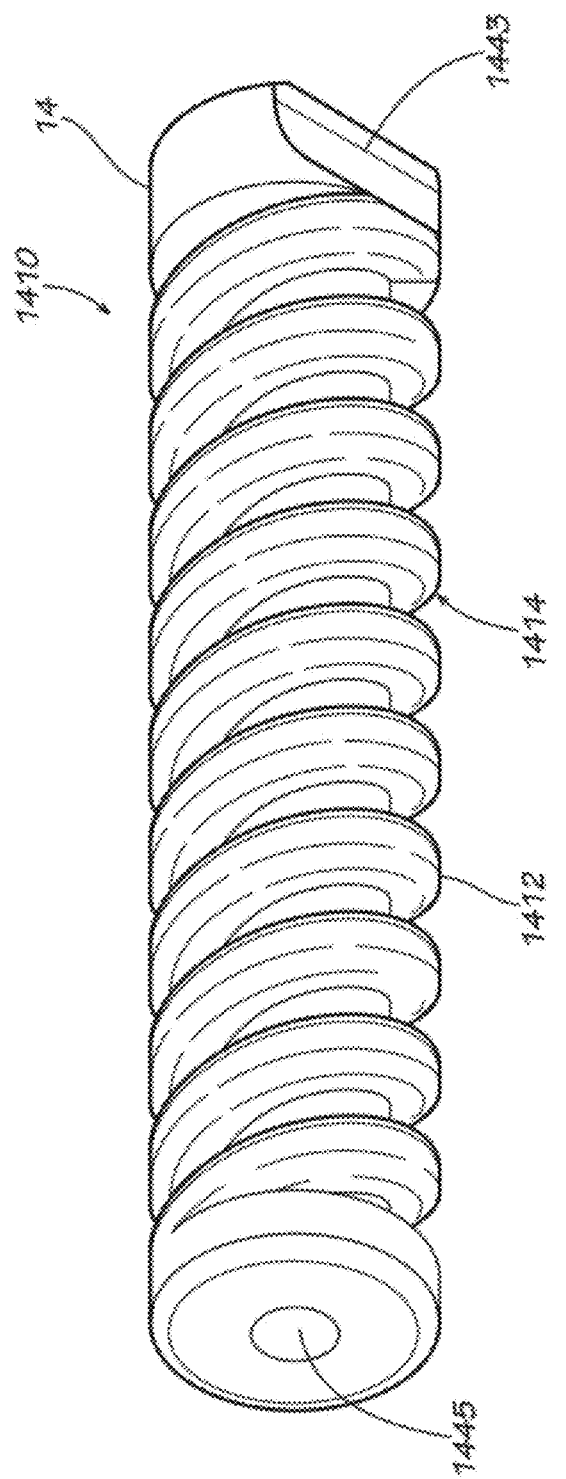
FIG. 34 is a perspective view of a retrieving device according to a fourteenth example embodiment of the invention.
Figure 35:
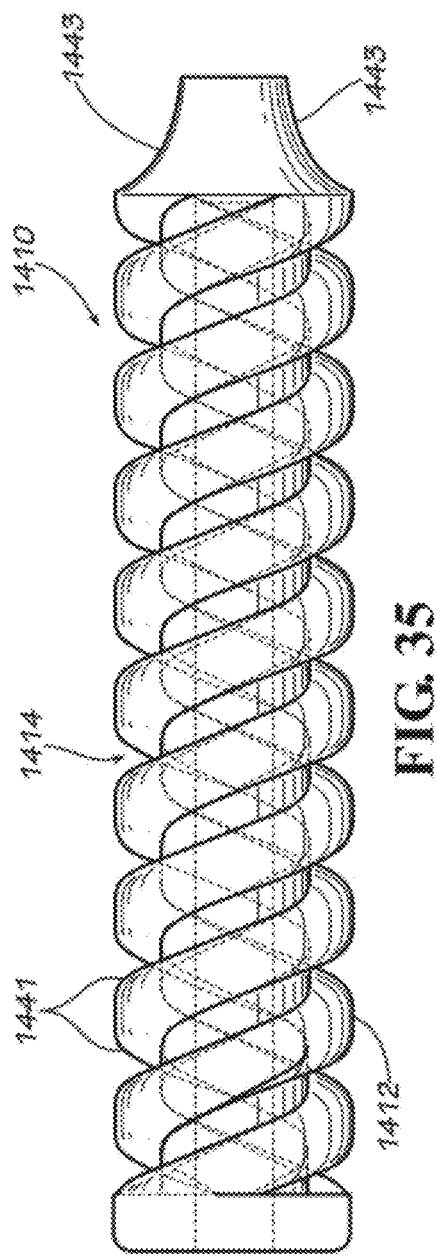
FIG. 35[A] is a side view of the retrieving device of FIG. 34.
Figure 36:
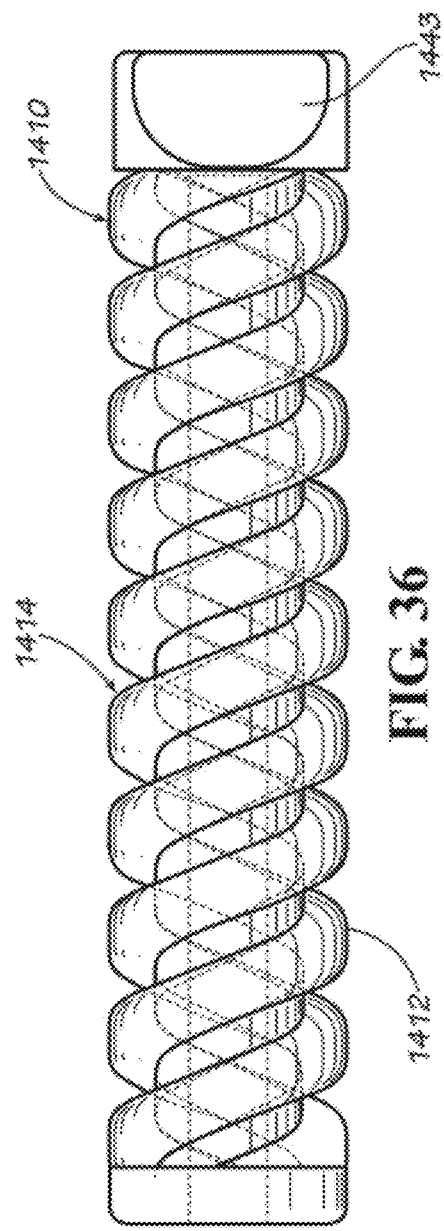
FIG. 36 shows the retrieving device of FIG. 35[A] rotated by 90 degrees.

Having described in detail the first embodiment and variation thereof, along with test data showing its effectiveness over the prior art, additional example embodiments will now be described. Persons of ordinary skill in the art will appreciate that the features of all of the embodiments described herein can be implemented in combinations not expressly disclosed herein to form alternative embodiments that are contemplated by and intended to be included within the scope of the present invention. As just one example of many, an included embodiment has a cylindrical body with a three-piece construction (softer intermediate section between two harder end sections as in FIG. 16) for encouraging picking it up at the proper place, a spiral external respiratory passageway (as in FIG. 34) on the intermediate section (and optionally on portions or the entire lengths of the end sections) for lateral breathing and for gripping, non-aligned internal respiratory passageways (as in FIG. 17) extending radially from sidewall to lateral passageway for breathing through the front of the mouth, a filtration screen in the internal respiratory passageways (as in FIG. 26) for keeping weed-ons from being sucked therethrough and into the dog's respiratory tract, and flotation elements in the end sections (as in FIG. 40) for buoyancy in water.

FIG. 16 shows a retrieving device 210 according to a second example embodiment of the invention. This embodiment is similar to those of the other herein-described embodiments, in that it has a body 212 and respiratory passageways 214 through which a dog can breathe when holding the device in its mouth during retrieval. In this embodiment, the generally cylindrical, hollow body 222 includes two ends sections 230 and an intermediate section 232 positioned between them. The intermediate section 232 is similar to the middle portion of the first embodiment. The end sections 230 are hollow and thus define lateral respiratory passageways, but do have any communicating respiratory passageways through the cylindrical sidewall of the body 212 (though in some alternative embodiments one or more such communicating respiratory passageways are included in one or both of the end sections, and in some other embodiments the end sections are solid and as such the internal cavity of the intermediate section defines a lateral portion of an internal respiratory passageway connecting radial or diametrical—extending all the way through the body linearly—respiratory passageways). And the end sections 230 are made of a harder material than the intermediate section 232, or they are made of the same or a similar material but not coated with a soft bite layer like the intermediate section is. In this way, holding the body 212 by the intermediate section 232 is more comfortable to the dog than holding it by one of the end sections 230, because the intermediate section is softer to bite on than the end sections. So in use the dog becomes conditioned and trained to pick up the bumper 210 by its intermediate section 232, which is the general location where hunting dogs should pick up bumpers (or actual game).

In an alternative embodiment, the respiratory passageways in the sidewall of the body are arranged so that none of the passageways are aligned with another of the passageways on the opposite side of the body. In this way, the respiratory passageways do not form a linear path, and instead they form a more circuitous/tortuous path through which particles such as grass fragments, weed-ons, seeds, and other particles are less likely to be sucked. These particles in grass can be drawn into the dog's respiratory system during inhalation when running through the grass and cause infection in the lungs. In other embodiments, the respiratory passageways have a curved, zigzagged, helical, or coiled shape and as such are non-linear for the same purpose. These non-linear passageway features can be combined into any of the other embodiments described herein, as mentioned above.

FIGS. 17-18 show a retrieving device 310 according to a third example embodiment of the invention. This embodiment is similar to those of the other herein-described embodiments, in that it has a body 312 and respiratory passageways 314 through which a dog can breathe when holding the device in its mouth during retrieval. In this embodiment, the generally cylindrical body 322 is made of a generally solid material and the respiratory passageways 314 are defined by a lateral internal conduit 334 and a plurality of communicating radial internal conduits 336. The lateral conduit 334 does not extend the length of the body 312 for lateral breathing, rather, it provides for airflow communication between the radial conduits 336, which extend only between the lateral conduit and the exterior surface of the body. And the radial conduits 336 are each non-aligned and non-axial with any other of the radial conduits so that a linear airflow path is not formed and instead a more circuitous/tortuous airflow path is formed through which particles such as grass fragments, weed-ons, seeds, and other particles are less likely to be sucked. These particles in grass can be drawn into the dog's respiratory system during inhalation when running through the grass and cause infection in the lungs. In addition, the radial conduits 336 in each axial/longitudinal series can be positioned in a staggered, offset arrangement, as depicted. The body 312 can be made of a soft material (e.g., a foam or rubber) and the internal conduits 334 and 336 made of a generally rigid material (e.g., hard plastic) for reinforcement so that the respiratory passageways 314 do not collapse when the bumper 310 is held in the dog's mouth under firm biting pressure.

FIGS. 19-20 show a retrieving device 410 according to a fourth example embodiment of the invention. This embodiment is similar to those of the other herein-described embodiments, in that it has a body 412 and respiratory passageways 414 through which a dog can breathe when holding the device in its mouth during retrieval. In this embodiment, the generally cylindrical, solid body 422 includes only radial internal conduits 436 defining the respiratory passageways 414. Because the radial internal passageways 436 are elongated (in the axial/longitudinal direction relative to the body 412), a lateral internal passageway is not needed for communication between all of the radial passageways.

FIGS. 21-22 show a retrieving device 510 according to a fifth example embodiment of the invention. This embodiment is similar to those of the other herein-described embodiments, in that it has a body 512 and at least one respiratory passageway 514 through which a dog can breathe when holding the device in its mouth during retrieval. In this embodiment, the generally cylindrical, solid body 512 includes only a single elongated laterally radial internal respiratory passageway 514 extending sidewall-to-sidewall all the way through the body 512. (When referring to respiratory passageways herein, "sidewall-to-sidewall" and "side-to-side" mean extending, in a direction generally transverse to the lateral axis of the body, through the body from one portion of the exterior surface to another generally opposite portion of the exterior surface, so that when the bumper is held in a dog's mouth during retrieval the dog can breathe through a respiratory passageway extending between the front and rear of the dog's mouth. This meaning applies even for embodiments that do not have two discrete "sides," such those with cylindrical bodies, and even for those embodiments that do not have true "sidewalls," such as those with solid bodies.) The body 512 can be made of a rigid material (e.g., of the type used in the first embodiment) so that the respiratory passageways 514 do not collapse when the bumper 510 is held in the dog's mouth (without the need for reinforcing internal conduits).

Figure 23:
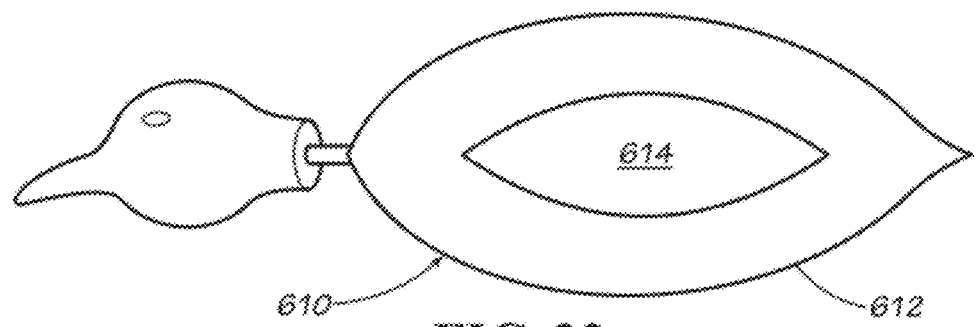
FIG. 23 is a perspective view of a retrieving device according to a sixth example embodiment of the invention.
Figure 24:
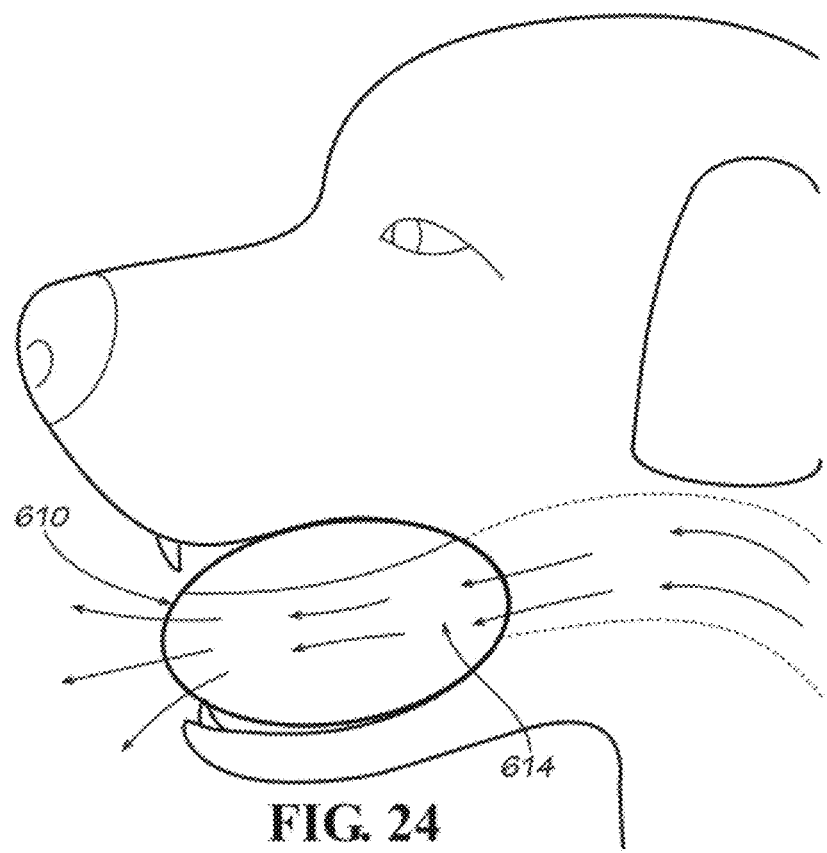
FIG. 24 is a cross-sectional view of the retrieving device of FIG. 23 in use being held in a dog's mouth.

FIGS. 23-24 show a retrieving device 610 according to a sixth example embodiment of the invention. This embodiment is similar to those of the other herein-described embodiments, in that it has a body 612 and at least one respiratory passageway 614 through which a dog can breathe when holding the device in its mouth during retrieval. In this embodiment, the body 612 has a shape resembling a dead fowl, with a single sidewall-to-sidewall respiratory passageway 614 formed in it (similarly to the fifth embodiment).

Figure 25:
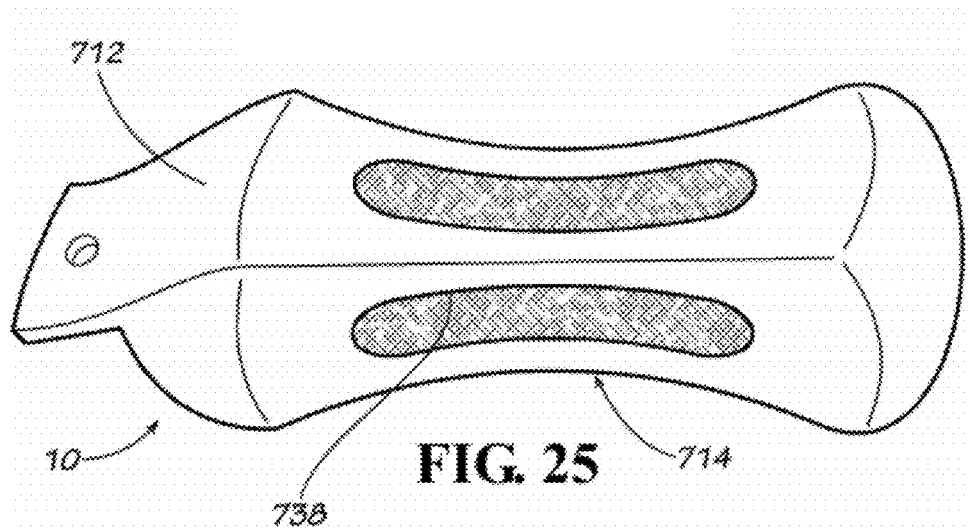
FIG. 25 is a side view of a retrieving device according to a seventh example embodiment of the invention.
Figure 26:
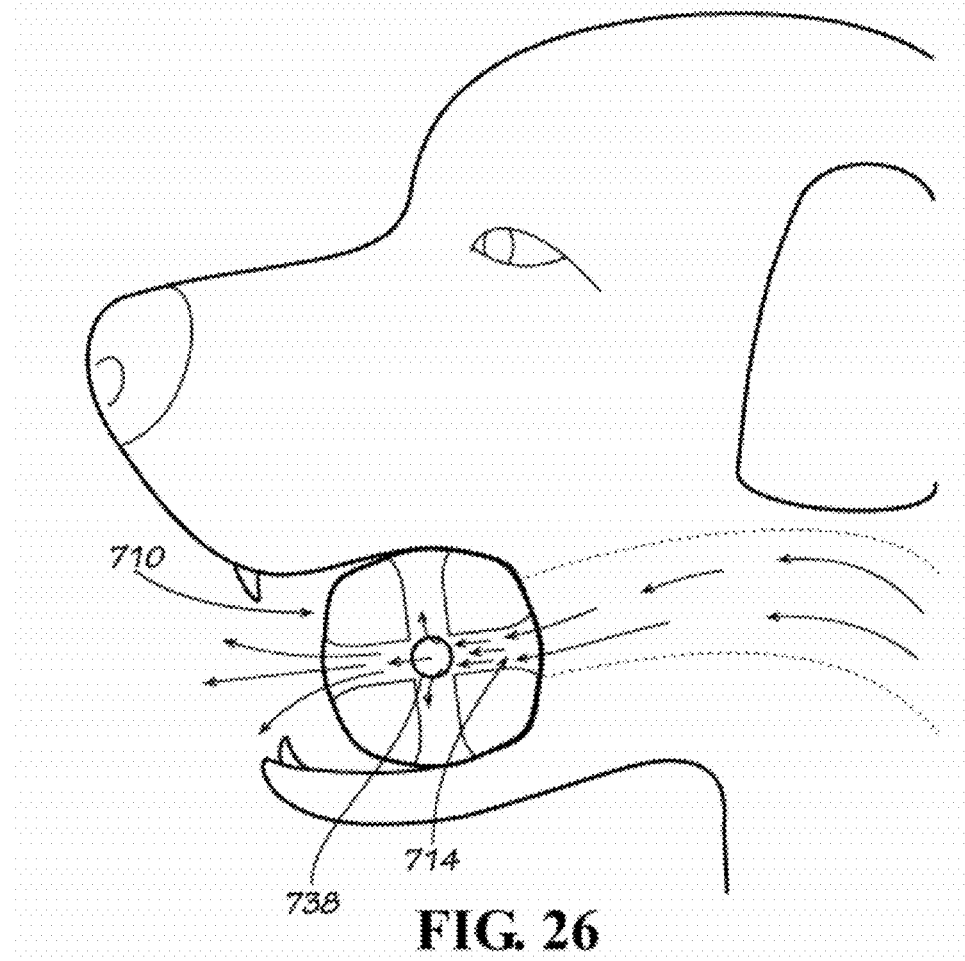
FIG. 26 is a cross-sectional view of the retrieving device of FIG. 25 in use being held in a dog's mouth.

FIGS. 25-26 show a retrieving device 710 according to a seventh example embodiment of the invention. This embodiment is similar to those of the other herein-described embodiments, in that it has a body 712 and respiratory passageways 714 through which a dog can breathe when holding the device in its mouth during retrieval. In this embodiment, the body 712 has a dead-fowl shape, with two sidewall-to-sidewall respiratory passageways 714 formed in it in a crossing (e.g., about 90 degrees to each other) arrangement to ensure that regardless of how the dog picks up the bumper 710 at least one of the respiratory passageways will be positioned for breathing through it and through the front of the dog's mouth.

In addition, the bumper 710 of this embodiment can include at least one screen 738 in each of the respiratory passageways 714 for screening out particles in the grass such as grass fragments, weed-ons, seeds, etc. that can be otherwise sucked through the passageways and into the dog's respiratory tract potentially causing infection. The openings in the screen 738 are small enough to prevent seeds and other similarly small particles from passing through them, but large enough that they do not tend to become clogged with saliva, dirt, and grass. The screen 738 can be provided by a mesh, lattice, fiber sheet or media, or other type of filter element. For example, the screen 738 can be provided by a NETLON plastic mesh from Netlon Industrial Products (Genk, Belgium). In the depicted embodiment, for example, the screen is provided by a grid-like screen sheet that is formed into the general shape of a hollow cylinder so that portions of it are within each of the respiratory passageways 714. This screen feature can be combined into any of the other embodiments described herein, as mentioned above.

Figure 27:
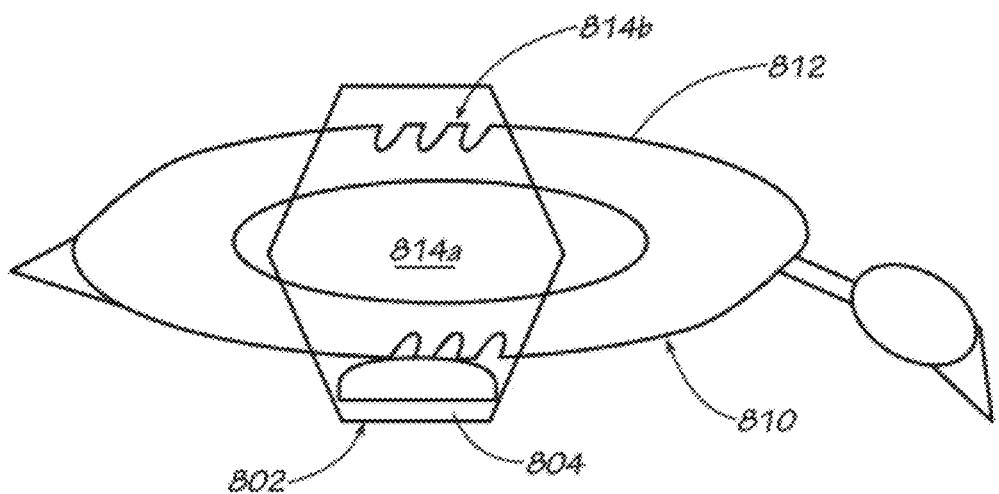
FIG. 27 is a side view of a retrieving device according to an eighth example embodiment of the invention, showing an approximate outline of a dog's mouth holding the device.

FIG. 27 shows a retrieving device 810 according to an eighth example embodiment of the invention. This embodiment is similar to those of the other herein-described embodiments, in that it has a body 812 and respiratory passageways through which a dog can breathe when holding the device in its mouth during retrieval. In this embodiment, the body 812 has a dead-fowl shape, with one sidewall-to-sidewall internal respiratory passageway 814a formed in it and with a plurality of external respiratory passageways 814b formed on it. In the depicted embodiment, the external respiratory passageways 814b are formed by grooves (e.g., recesses, depressions, indentations, or notches) extending circumferentially around the body 812 between the surface openings of the internal respiratory passageway 814a. The external respiratory passageways 814b provide a pathway for airflow around the bumper 810 (instead of through it). Thus, the top breathable space between the roof of the mouth and the bumper is increased, and a bottom breathable space between the between the tongue and the bumper is formed, to provide for increased airflow through the mouth (in FIG. 27, reference character 802 represents the outline of the dog's mouth, and 804 represents its tongue).

Figure 28:
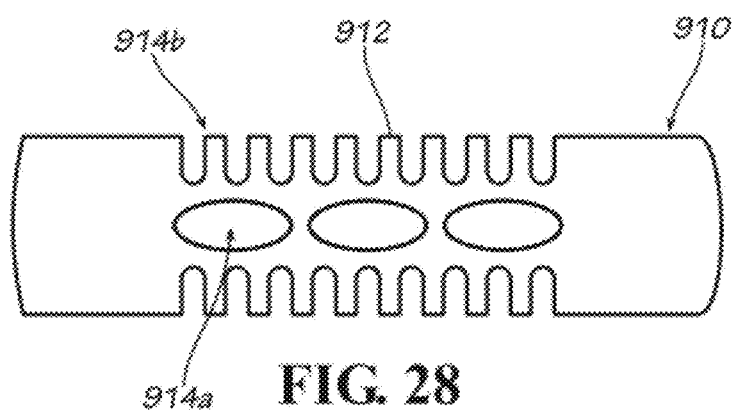
FIG. 28 is a side view of a retrieving device according to a ninth example embodiment of the invention.
Figure 29:
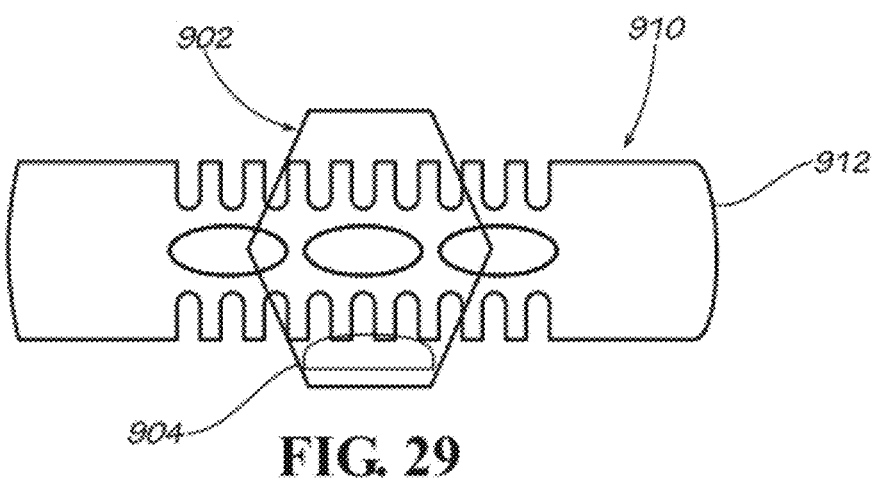
FIG. 29 shows the retrieving device of FIG. 28 and an approximate outline of a dog's mouth holding the device.

FIGS. 28-29 show a retrieving device 910 according to a ninth example embodiment of the invention. This embodiment is similar to those of the other herein-described embodiments, in that it has a body 912 and respiratory passageways through which a dog can breathe when holding the device in its mouth during retrieval. In this embodiment, the body 912 is cylindrical with an axial/longitudinal series of sidewall-to-sidewall internal respiratory passageways 914a formed in it and with a plurality of external respiratory passageways 914b formed on it (in FIG. 29, reference character 902 represents the outline of the dog's mouth, and 904 represents its tongue).

Figure 30:
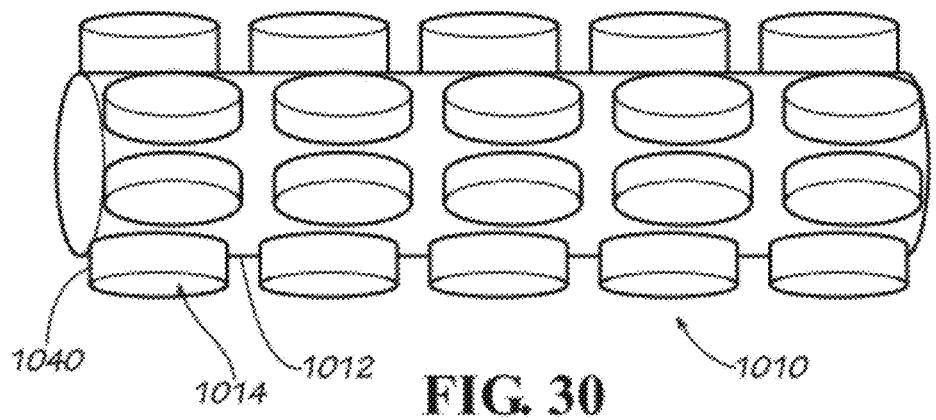
FIG. 30 is a perspective view of a retrieving device according to a tenth example embodiment of the invention.

FIG. 30 shows a retrieving device 1010 according to a tenth example embodiment of the invention. This embodiment is similar to those of the other herein-described embodiments, in that it has a body 1012 and respiratory passageways 1014 through which a dog can breathe when holding the device in its mouth during retrieval. In this embodiment, the cylindrical body 1012 includes a plurality of stubs 1040 extending radially outward from its surface and forming extended portions of the respiratory passageways 1014. The laterally or longitudinally extending gaps between the protruding stubs 1040 define external lateral respiratory passageways through which air can flow through the sides of the dog's mouth.

Figure 31:
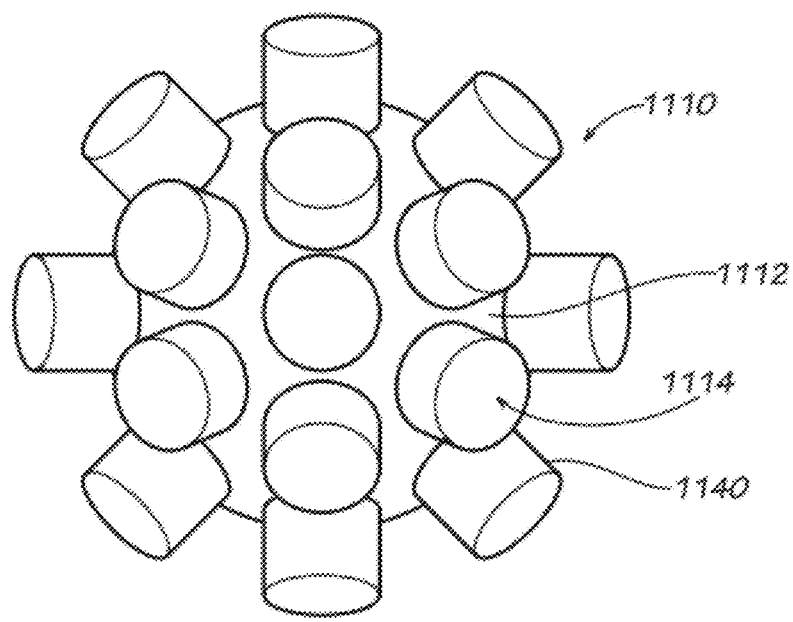
FIG. 31 is a perspective view of a retrieving device according to an eleventh example embodiment of the invention.
Figure 32A:
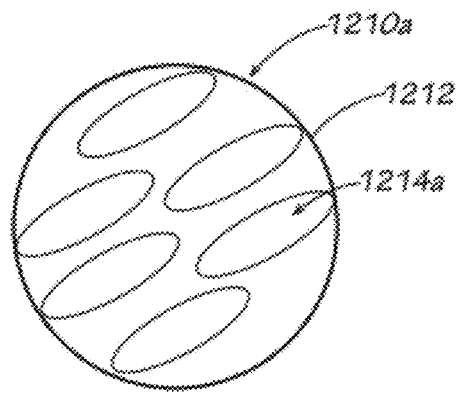
FIGS. 32A-D are side views of various retrieving devices according to a twelfth example embodiment of the invention.
Figure 32B:
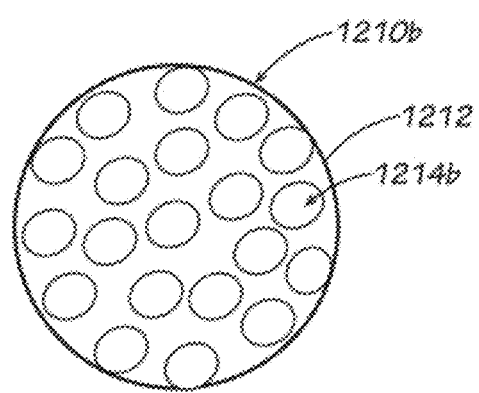
Figure 32C:
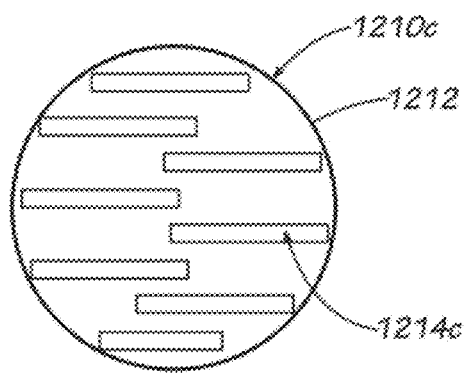
Figure 32D:
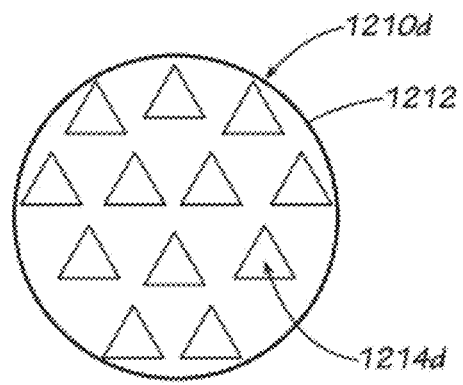
Figure 33A:
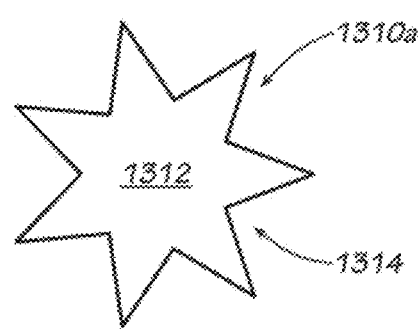
FIGS. 33A-F are end views of various retrieving devices according to a thirteenth example embodiment of the invention.
Figure 33B:
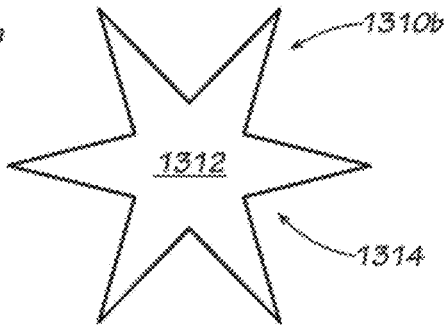
Figure 33C:
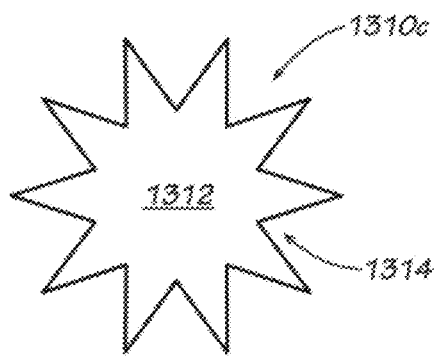
Figure 33D:
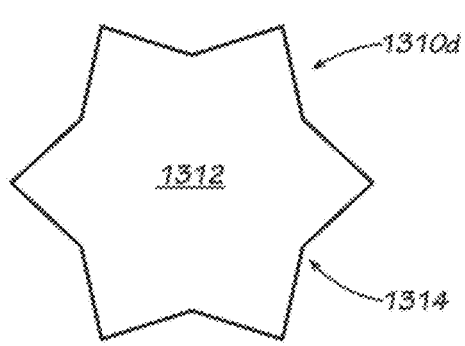
Figure 33E:
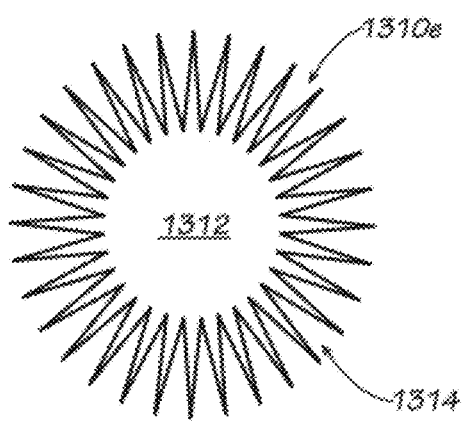
Figure 33F:
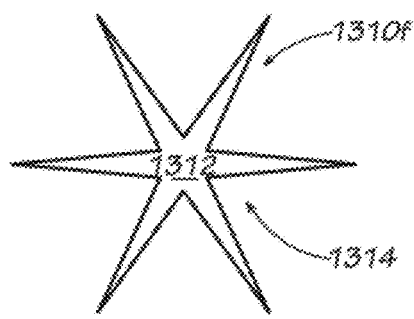

FIG. 31 shows a retrieving device 1110 according to an eleventh example embodiment of the invention. This embodiment is similar to those of the other herein-described embodiments, in that it has a body 1112 and respiratory passageways 1114 through which a dog can breathe when holding the device in its mouth during retrieval. In this embodiment, the body 1112 is spherical and includes a plurality of stubs 1140 extending radially outward from its surface and forming extended portions of the respiratory passageways 1114 for providing for enhanced airflow.

FIGS. 32A-D show retrieving devices 1210a-d according to a twelfth example embodiment of the invention. These bumpers are similar to those of the other herein-described embodiments, in that they each have a body 1212 and respiratory passageways through which a dog can breathe when holding the device in its mouth during retrieval. In this embodiment, the body 1212 of each of these the bumpers 1210a-d is spherical and includes a plurality of internal respiratory passageways extending all the way sidewall-to-sidewall through them. In the bumper 1210a of FIG. 32A the respiratory passageways 1214a have an oval profile, in the bumper 1210b of FIG. 32B the respiratory passageways 1214b have a circular profile, in the bumper 1210c of FIG. 32C the respiratory passageways 1214c have a rectangular profile, and in the bumper 1210d of FIG. 32D the respiratory passageways 1214d have a triangular profile.

FIGS. 33A-F show retrieving devices 1310a-f according to a thirteenth example embodiment of the invention. These bumpers are similar to those of the other herein-described embodiments, in that they each have a body 1312 and lateral respiratory passageways 1314 through which a dog can breathe when holding the device in its mouth during retrieval. In this embodiment, the body 1312 of each of these the bumpers 1310a-f is elongated with a generally star-shaped end profile and with external lateral respiratory passageways 1314 through which a dog can breathe when holding the device in its mouth during retrieval. In particular, when these bumpers 1310a-f are held in the dog's mouth, the depth of the external lateral respiratory passageways 1314 is not filled by the dog's lips, so there is not a seal between the lips and the bumper, and instead at least a portion of each of the laterally extending passageways (or at least some of them) is unobstructed to permit airflow therethrough to enable the dog to breathe laterally through the side of its mouth. In typical embodiments, the points of the star-shaped bodies 1312 are rounded more than is depicted.

FIGS. 34-37 show a retrieving device 1410 according to a fourteenth example embodiment of the invention. This bumper is similar to those of the other herein-described embodiments, in that it has a body 1412 and at least one respiratory passageway 1414 through which a dog can breathe when holding the device in its mouth during retrieval. In this embodiment, the respiratory passageway 1414 is of an external lateral type and is provided by a spiral (i.e., helical) groove formed in the exterior surface of the body 1412. In typical embodiments, the groove 1414 has a width of about 0.1 inches to about 0.5 inches, a depth of about 0.3 inches to about 0.7 inches, and a pitch of about 10 to about 30 degrees so that a sufficient air-path remains if the dog's lips push into the groove some. For example, in one embodiment the groove 1414 has a width of about ⅜ inch, a depth of about ⅝ inch, and a pitch of about 15 degrees to about 20 degrees (about 0.5 to 3 revolutions per inch). And in that and other embodiments, there are two spiral respiratory passageways 1414 formed by a double-helix groove 1414, that is, two intertwined helixes wound around the body 1412. The spiral shape provides a non-linear, more tortuous/circuitous passageway for air to flow laterally through the sides of the dog's mouth as well as through the top gap between the mouth roof and the bumper and the bottom gap between the tongue and the bumper, thereby helping keep weed-ons, grass pieces, seeds, etc. from being drawn into the dog's respiratory tract during inhalation.

An issue in the design of the spiral helix grooves is balancing a maximal open area for air passage, a more tortuous/ circuitous air path (no straight air path for airborne debris), and ease of molding, all the while maintaining sufficient component thickness to resist the dog's chewing. The use of two intertwined helices helps to maintain a large open area for air movement and still maintain a tortuous (not straight through) air path. The spiral angle can vary between 0 degrees (circumferential grooves) and 90 degrees (axial grooves; see FIGS. 33A-F), with the lower angles allowing the greatest air flow and the higher angles providing the greatest tortuous-path protection from inhaled debris.

If desired, one or both of the end portions of the body 1412 can be narrowed or tapered, with a hole formed through at least one of the narrowed end portions for attaching a cord for ease of carrying or throwing. The body 1412 can have a hollow core 1445 that holds air (or another fluid) for flotation, with at least one sealing element such as an end-cap or plug that closes the hollow core with an airtight seal. Furthermore, the grooved body can form an intermediate section 1432 of the body 1412, and end-caps or end sections can be attached to the lateral ends of the intermediate section, with the end-caps formed of a harder material or having spikes or other elements that are uncomfortable for dogs to bite to discourage them from biting the bumper there. In addition, such end-caps or end sections can be made of a buoyant material to function as flotation elements, so that when plugged into the central core 1445 (or otherwise attached to the intermediate section 1432) the bumper 1410 will float in water.

In addition, the spiral arrangement of the groove 1414 helps guide the dog's teeth into the groove. This is because even if one tooth might not immediately bite into a portion of the groove, an adjacent tooth that is linear with that tooth will then be positioned for biting into an adjacent portion of the groove, which is not co-planar with the teeth. In some embodiments, the outer edges 1441 of the portions of the body 1412 defining the outer portions of the groove 1414 are ramped (e.g., curved or linearly angled) so that if a tooth bites onto that ramp it will be guided into the groove (see, e.g., FIG. 35A). Once in the groove 1414, the facing walls of the groove act as retaining walls to retain the tooth there, helping provide for better and easier gripping of the bumper 1410 by the dog.

Figure 37:
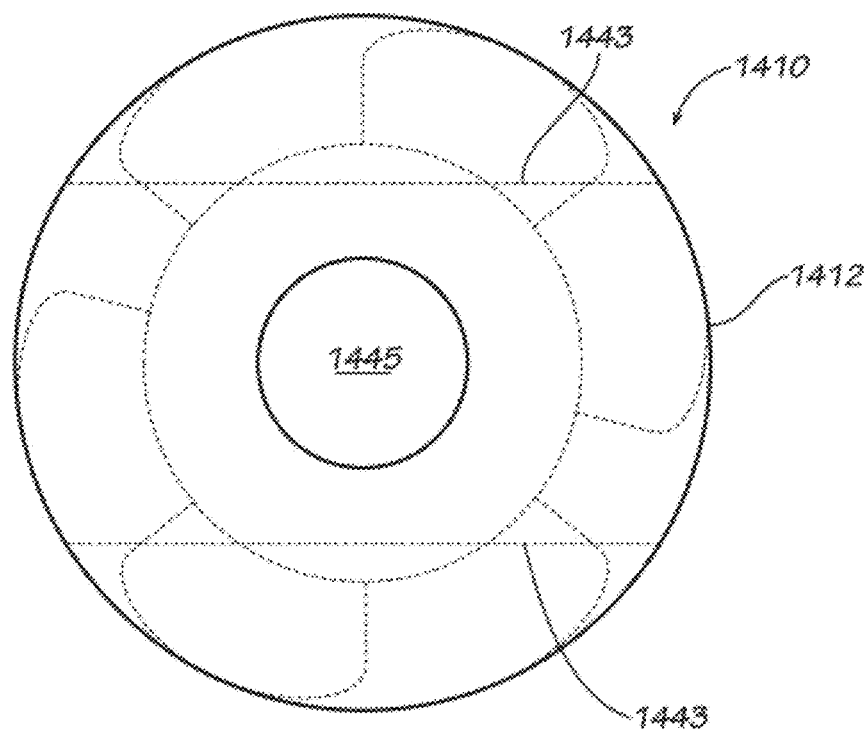
FIG. 37 is an end view of the retrieving device of FIG. 36.
Figure 37A:
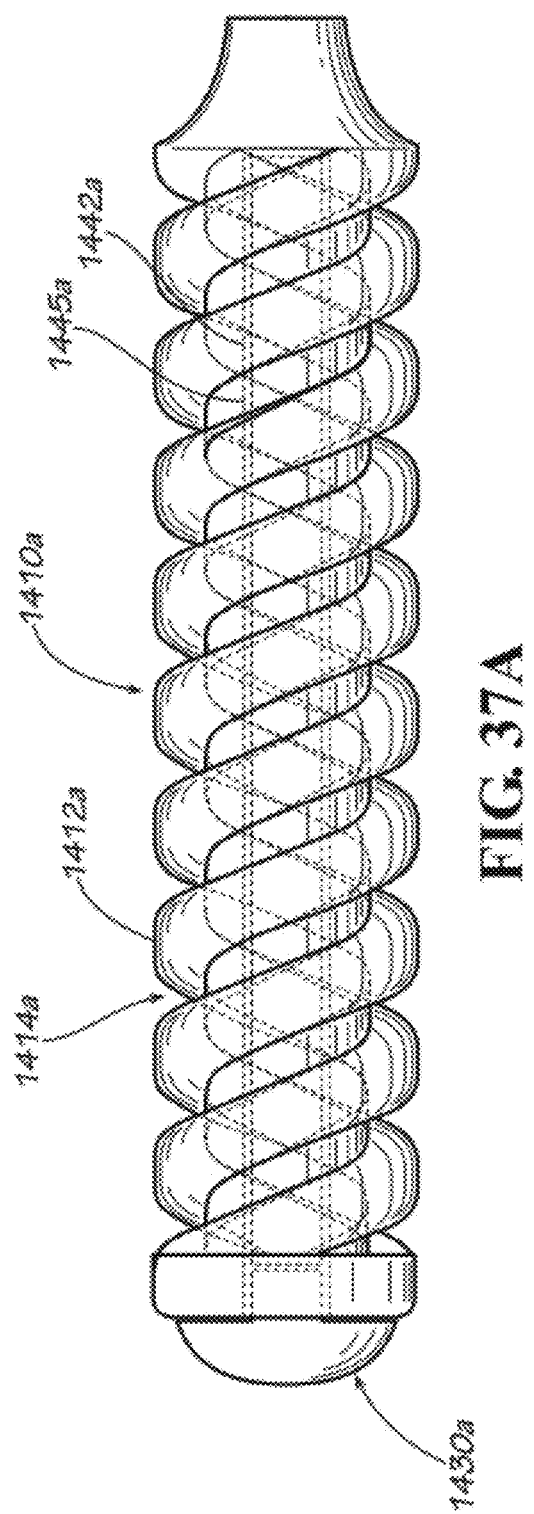
FIG. 37A is a side view of a retrieving device according to an alternative to the fourteenth embodiment of FIG. 34.

In an alternative embodiment shown in FIG. 37A, the bumper 1410a has a body 1412a with a spiral-groove respiratory passageway 1414a, similarly to the fourteenth embodiment. In addition, the hollow core 1445a of the body 1412a holds or forms a flotation element 1442a to provide overall buoyancy of the bumper 1410a. The flotation element 1442a can be of a type described with respect to the eighteenth embodiment, and as such can be provided for example by a foam insert or by the core being sealed off with air inside it. For example, in the depicted embodiment, the core 1445a extends through only one end of the body 1412a and an endcap 1430a is attached to that open end to close it off with the flotation element inside.

This spiral lateral external respiratory passageway feature can be combined into any of the other embodiments described herein, as mentioned above. As such, in some embodiments a spiral lateral external respiratory passageway is formed on a body having a different shape, such as spherical or polygonal, or in the shape of fowl or a conventional dog toy or training aid.

Figure 38A:
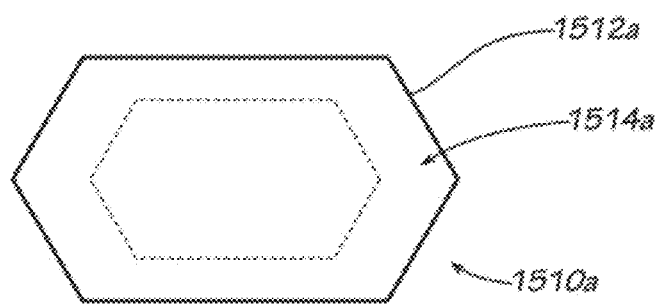
FIGS. 38A-B are end views of various retrieving devices according to a fifteenth example embodiment of the invention.
Figure 38B:
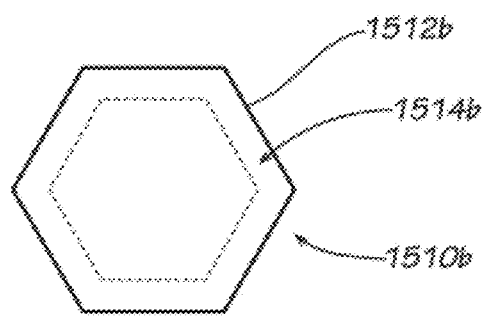

FIGS. 38A-B show retrieving devices 1510a-b according to a fifteenth example embodiment of the invention. These bumpers are similar to those of the other herein-described embodiments, in that they each have a body 1512a-b and at least one respiratory passageway 1514a-b through which a dog can breathe when holding the device in its mouth during retrieval. In this embodiment, the body 1512a-b of each of these bumpers 1510a-b is elongated with a generally hexagonal (or other polygonal) profile and with one or more thinner intermediate portions that function as one or more external lateral respiratory passageways 1514a-b through which a dog can breathe when holding the device in its mouth during retrieval.

Figure 39A:
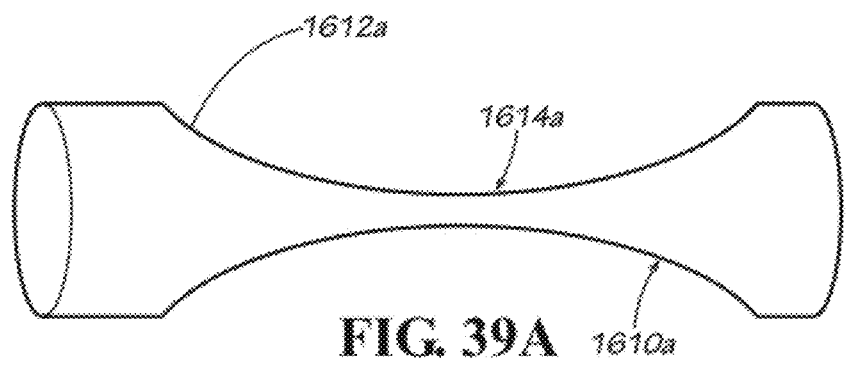
FIGS. 39A-C are perspective views of various retrieving devices according to a sixteenth example embodiment of the invention.
Figure 39B:
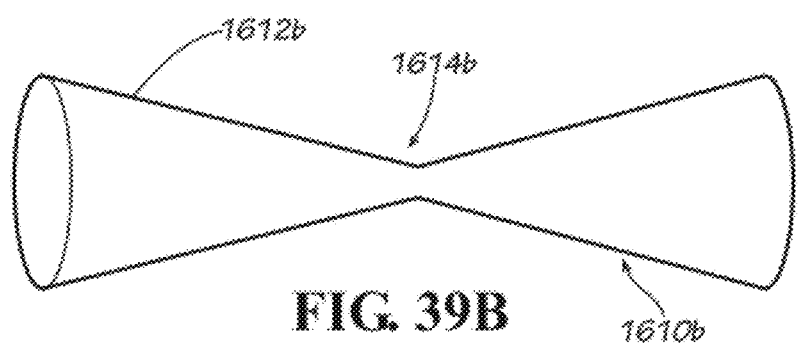
Figure 39C:
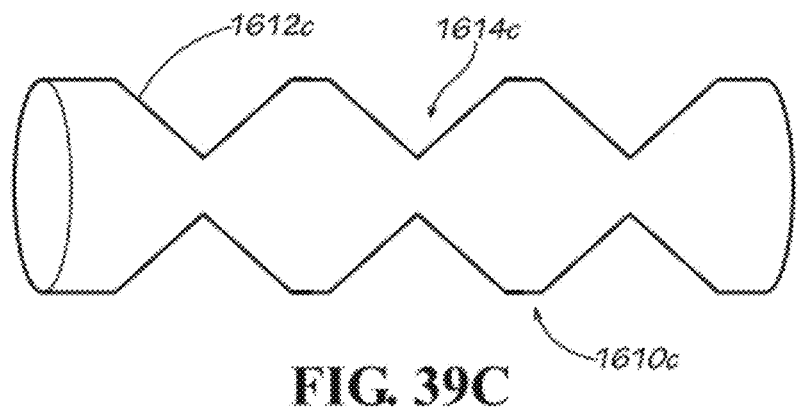

FIGS. 39A-C show retrieving devices 1610a-c according to a sixteenth example embodiment of the invention. These bumpers are similar to those of the other herein-described embodiments, in that they each have a body 1612a-c and at least one lateral respiratory passageway 1614a-c through which a dog can breathe when holding the device in its mouth during retrieval. In this embodiment, the body 1612a-c of each of these bumpers 1610a-c is elongated with one or more external respiratory passageways 1614a-c through which a dog can breathe through the front of its mouth when holding the device in its mouth during retrieval.

Figure 40:
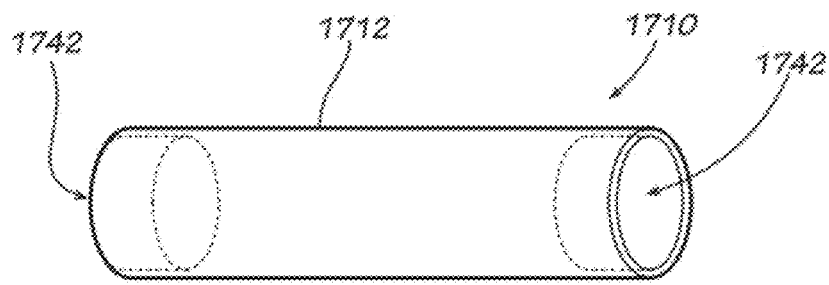
FIG. 40 is a perspective view of a retrieving device according to a seventeenth example embodiment of the invention.

FIG. 40 shows a retrieving device 1710 according to a seventeenth example embodiment of the invention. This bumper is similar to those of the other herein-described embodiments, in that it has a body 1712 and at least one lateral respiratory passageway (not depicted in the figure) through which a dog can breathe when holding the device in its mouth during retrieval. In this embodiment, the bumper 1710 includes at least one flotation element 1742 that provides an overall buoyancy for the bumper so that the bumper floats in water (e.g., lakes, ponds, rivers, or brackish or saltwater bodies or flows). The at least one flotation element 1742 can be provided by a rigid or flexible foam, a sac of fluid (air or another less-dense-than-water gas or liquid), or another conventional buoyant element. In the depicted embodiment, the bumper 1710 has two flotation elements 1742, each disc-shaped and housed within a respective end portion of a cylindrical body 1712. In other embodiments, the flotation element(s) have one or more lateral openings that form a portion of a lateral respiratory passageway.

Figure 41A:
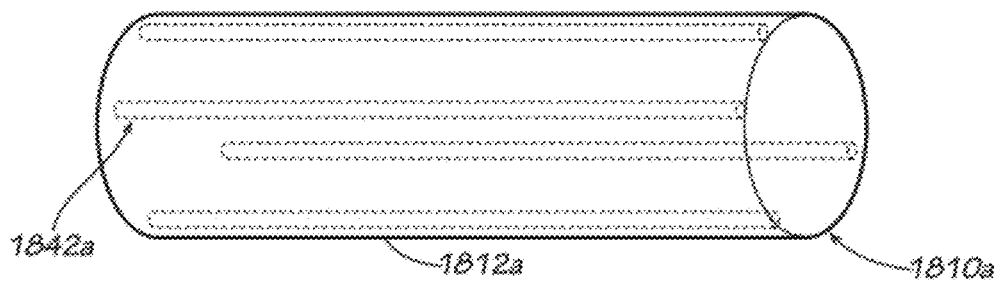
FIGS. 41A-B are perspective views of various retrieving devices according to an eighteenth example embodiment of the invention.
Figure 41B:
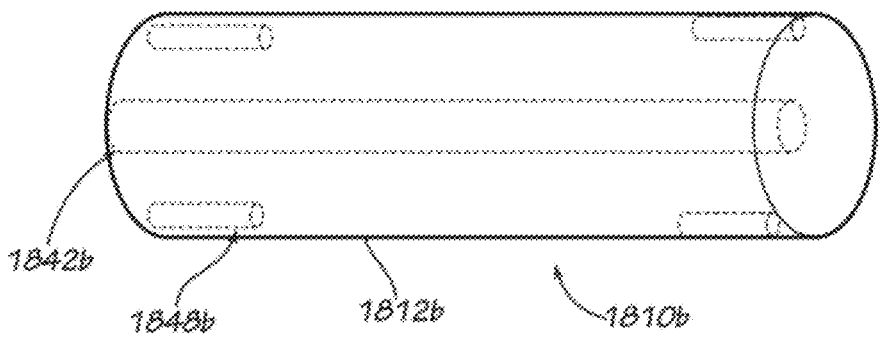

FIGS. 41A-B show retrieving devices 1810a-b according to an eighteenth example embodiment of the invention. These bumpers are similar to those of the other herein-described embodiments, in that they each have a body 1812a-b and at least one respiratory passageway (not depicted in the figures) through which a dog can breathe when holding the device in its mouth during retrieval. In this embodiment, the bumpers 1810 each include at least one flotation element 1842 that provides an overall buoyancy for the bumper so that the bumper floats in water, similarly to the seventeenth embodiment. In the depicted embodiments, the flotation elements 1842 are provided by foam rods parallel to the axis of the body and housed in radially peripheral and/or central portions of the bodies. These flotation features can be combined into any of the other embodiments described herein, as mentioned above.

There are a number of commercially available extruded or molded products used in a variety of unrelated applications that may, with some modification in size, geometry or materials of construction, be used as breathable bumpers according to additional embodiments of the invention. Such commercially available products include, for example, plastic filter cores for household water filters or industrial fluid filters, and plastic pipe for footer drains and septic field drains. Such products are manufactured by Conwed (Minneapolis, Minn.), Industrial Netting (Minneapolis, Minn.), DelStar Technologies (Middleton, Del.), Oxford Plastics (Ontario, Canada) and other companies, and are available from numerous suppliers. These filter cores can include a cylindrical set of vertical and horizontal intersecting polymer rods, or a combination of a large load-supporting segment and small screen segments. Such filter cores can be used as breathable bumpers according to the invention for example by making them out of a different material. For example, such water-filter cores can be modified for use as breathable bumpers according to the invention by making the entire structures (typically polypropylene, polyethylene or nylon) of a more flexible, softer material, such as polyurethane or a thermoplastic elastomer, so that they do not get badly chewed up by the dog.

Having described numerous example embodiments, a method of using any of these bumpers will now be described as another aspect of the invention. In the method, a bumper having a body defining one or more respiratory passageways is provided. The bumper can be any of those described herein or it can be another type of bumper or other object (e.g., a chew toy) with one or more respiratory passageways. The bumper is launched a distance away from a dog. This can be done manually by a trainer or other caretaker (e.g., an owner or sitter) throwing the bumper through the air, or by a launch machine. The launcher can be at the same location as the dog or remote from the dog. Before launch, the respiratory passageway of the bumper is unobstructed, with no food or other object placed within and obstructing any of its respiratory passageways to restrict airflow therethrough.

The dog tracks the flight of the launched bumper and runs out to the location where the bumper falls while the caretaker (or another person) monitors this. For embodiments including one or more flotation elements, if the bumper comes down in water, the bumper floats while the dog swims out to it. The dog picks up the bumper and holds the bumper in its mouth by its teeth for retrieval. When doing so with some embodiments, the teeth will tend to slide into the respiratory passageways to provide for better gripping of the bumper. The dog then retrieves the bumper, for example, by returning it to the launcher. While the dog runs with the bumper in its mouth during retrieval, it is able to breath through the respiratory passageways to thereby provide for improved comfort and health of the dog. Embodiments including tortuous/circuitous respiratory passageways and/or screens prevent or at least reduce weed-ons, grass fragments, seeds, and/or other particles from being drawn through the passageways and into the dog's lungs during inhalation. After retrieval, the process is repeated as desired to compete a retrieving session.

While the invention has been described with reference to example embodiments, it will be understood by those skilled in the art that a variety of modifications, additions, and deletions are within the scope of the invention, as defined by the following claims.

What is claimed is:

1. A device for retrieval by an animal with a mouth, comprising:
  a body adapted to be picked up, at least partially received into, and securely held in the animal's mouth during retrieval, wherein the body includes two end sections and an intermediate section positioned therebetween, with the end and intermediate sections having exterior surfaces, and with the exterior surfaces of the end sections having a greater hardness than the exterior surface of the intermediate section, having protrusions, or both, wherein the end sections are less comfortable to bite on and thereby encourage picking up and holding the body at the intermediate section; and
  one or more respiratory passageways formed in the body in an arrangement such that, regardless of how the animal picks up the body and holds the body in its mouth, one or more of the respiratory passageways individually or cooperatively extend from the mouth to out of the mouth in a breathable position so that air can flow through the breathable respiratory passageways into and out of the mouth.

2. The retrieving device of claim 1, wherein the body is elongate.

3. The retrieving device of claim 2, wherein the body is generally cylinder-shaped.

4. The retrieving device of claim 2, wherein the body has the general shape of a dead fowl.

5. The retrieving device of claim 1, wherein at least a portion of the body is hollow and defines at least a lateral portion of one of the respiratory passageways.

6. The retrieving device of claim 1, wherein the body has a shell sidewall, open ends, an internal cavity that defines a lateral one of the respiratory passageways extending longitudinally therethrough, and has at least two radial openings formed through the sidewall to cooperatively define a side-to-side one of the respiratory passageways, wherein the side-to-side respiratory passageway and the lateral respiratory passageway cooperatively define a lateral airflow path through which the animal can breathe laterally through its mouth, and wherein the side-to-side respiratory passageway defines a front airflow path through which the animal can front-breathe through its mouth.

7. The retrieving device of claim 1, wherein the body is made of a material with a rigidity selected for structural strength sufficient to prevent the body from collapsing the respiratory passageways when held in the animal's mouth and bit on, and also sufficient to resist chewing action by the dog.

8. The retrieving device of claim 1, wherein the body has at least two radial openings formed therethrough to cooperatively define a side-to-side one of the respiratory passageways, wherein the side-to-side respiratory passageway defines a front airflow path through which the animal can front-breathe through its mouth, and wherein the two radial openings forming the respective side-to-side respiratory passageway are not in linear alignment so that the front airflow path they define is tortuous and non-linear to reduce inhalation of airborne debris during retrieval of the device.

9. The retrieving device of claim 1, further comprising a plurality of grooves formed in the body that define the respiratory passageways, wherein the grooves are lateral/longitudinal for lateral breathing, circumferential for front breathing, or a combination thereof.

10. The retrieving device of claim 1, further comprising at least one groove formed in the body in a spiral shape to define the respiratory passageway for lateral and front breathing, wherein the spiral shape is selected with a pitch for defining an open surface area for free breathing and for defining a tortuous airflow path to reduce inhalation of airborne debris.

11. The retrieving device of claim 10, wherein the at least one groove is provided by two grooves in a double-helix arrangement to define the respective respiratory passageways for lateral and front breathing.

12. The retrieving device of claim 10, wherein the spiral groove has a pitch selected so that the animal's teeth and the groove are not co-planar to guide the animal's teeth into the groove for an improved biting grip.

13. The retrieving device of claim 1, further comprising at least one flotation element positioned in or on the body to provide overall buoyancy for the device so that it floats in water.

14. The retrieving device of claim 13, wherein the at least one flotation element is provided by foam inserts in end sections of the body or foam rods extending longitudinally within the body and parallel to a longitudinal axis of the body.

15. A method of retrieval by an animal, comprising:
providing the retrieving device of claim 1;
launching the device a distance away from the animal, wherein at launch the at least one respiratory passageway of the device is unobstructed, with no food or other object placed within and obstructing the respiratory passageway to restrict airflow therethrough;
monitoring the animal while it runs out to the location where the device falls, picks up the device, and retrieves the device while holding the device in its mouth, wherein the animal is able to breath through the respiratory passageways during retrieval to provide for improved comfort and health of the animal; and
repeating the previous steps a desired number of times to complete a retrieving session.

16. A device for retrieval by an animal with a mouth, comprising:
a body adapted to be picked up, at least partially received into, and securely held in the animal's mouth during retrieval; and
one or more respiratory passageways formed in the body in an arrangement such that, regardless of how the animal picks up the body and holds the body in its mouth, one or more of the respiratory passageways individually or cooperatively extend from the mouth to out of the mouth in a breathable position so that air can flow through the breathable respiratory passageways into and out of the mouth,
wherein the one or more respiratory passageways are formed in the body in an array of plural series of the respiratory passageways spaced along the body, in an overlapping but staggered offset arrangement.

17. The retrieving device of claim 16, wherein two adjacent ones of the plural series of passageways are staggered and longitudinally offset, with the center of each passageway positioned so that it is not in circumferential alignment with the center of any passageway in either of the circumferentially adjacent series of passageways, wherein the passageways are closely packed together to provide a large breathable/open surface area in the body.

18. A device for retrieval by an animal with a mouth, comprising:
a body adapted to be picked up, at least partially received into, and securely held in the animal's mouth during retrieval; and
one or more respiratory passageways formed in the body in an arrangement such that, regardless of how the animal picks up the body and holds the body in its mouth, one or more of the respiratory passageways individually or cooperatively extend from the mouth to out of the mouth in a breathable position so that air can flow through the breathable respiratory passageways into and out of the mouth,
wherein the body includes a plurality of internal conduits defining the respiratory passageways therethrough, and the body is otherwise solid.

19. A device for retrieval by an animal with a mouth, comprising:
a body adapted to be picked up, at least partially received into, and securely held in the animal's mouth during retrieval; and
one or more respiratory passageways formed in the body in an arrangement such that, regardless of how the animal picks up the body and holds the body in its mouth, one or more of the respiratory passageways individually or cooperatively extend from the mouth to out of the mouth in a breathable position so that air can flow through the breathable respiratory passageways into and out of the mouth, wherein the body has at least two radial openings formed therethrough to cooperatively define a side-to-side one of the respiratory passageways, wherein the side-to-side respiratory passageway defines a front airflow path through which the animal can front-breathe through its mouth; and
at least one groove formed in the body that defines one of the respiratory passageways.

20. A device for retrieval by an animal with a mouth, comprising:

a body adapted to be picked up, at least partially received into, and securely held in the animal's mouth during retrieval;

one or more respiratory passageways formed in the body in an arrangement such that, regardless of how the animal picks up the body and holds the body in its mouth, one or more of the respiratory passageways individually or cooperatively extend from the mouth to out of the mouth in a breathable position so that air can flow through the breathable respiratory passageways into and out of the mouth; and at least one screen positioned within the respiratory passageway, wherein the screen filters out and reduces inhalation of airborne debris during retrieval of the device.

21. A device for retrieval by a hunting dog with a mouth, comprising:

a body adapted to be picked up, at least partially received into, and securely held in the animal's mouth during retrieval, wherein the body is elongate and generally cylinder-shaped; and at least one groove formed in the body in a spiral shape to define at least one respective respiratory passageway that extends from the mouth to out of the mouth when held in the dog's mouth so that, regardless of how the dog picks up the body and holds the body in its mouth, air can flow through the respiratory passageway into and out of the mouth so that the dog can front and laterally breathe, wherein the spiral shape is selected with a pitch for defining an open surface area for free breathing and for defining a tortuous airflow path to reduce inhalation of airborne debris during retrieval of the device, wherein the body includes two end sections and an intermediate section positioned therebetween, with the end and intermediate sections having exterior surfaces, and with the exterior surfaces of the end sections having a greater hardness than the exterior surface of the intermediate section, having protrusions, or both, wherein the end sections are less comfortable to bite on and thereby encourage picking up and holding the body at the intermediate section.

22. The retrieving device of claim 21, wherein the at least one groove is provided by two grooves in a double-helix arrangement to define the two respective respiratory passageways for lateral and front breathing.

23. The retrieving device of claim 21, wherein the spiral groove has a pitch selected so that the dog's teeth and the groove are not co-planar to guide the dog's teeth into the groove for an improved biting grip.

24. The retrieving device of claim 21, further comprising at least one flotation element positioned in or on the body to provide overall buoyancy for the device so that it floats in water.

25. A method of retrieval by a hunting dog, comprising:

providing the retrieving device of claim 21;

launching the device a distance away from the dog, wherein at launch the at least one respiratory passageway of the device is unobstructed, with no food or other object placed within and obstructing the respiratory passageway to restrict airflow therethrough;

monitoring the dog while it runs out to the location where the device falls, picks up the device, and retrieves the device while holding the device in its mouth, wherein the dog is able to breath through the respiratory passageways during retrieval to provide for improved comfort and health of the animal; and repeating the previous steps a desired number of times to complete a retrieving session.

\* \* \* \* \*